(12) United States Patent
Roche

(10) Patent No.: US 11,104,178 B2
(45) Date of Patent: *Aug. 31, 2021

(54) CARD WITH LAYERS ON ONE SIDE

(71) Applicant: Griff and Associates, L.P., Fallsington, PA (US)

(72) Inventor: Timothy Roche, Bristol, PA (US)

(73) Assignee: Griff and Associates, L.P., Fallsington, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,233

(22) Filed: Jul. 17, 2019

(65) Prior Publication Data

US 2020/0023665 A1  Jan. 23, 2020

Related U.S. Application Data

(60) Provisional application No. 62/701,171, filed on Jul. 20, 2018, provisional application No. 62/713,776, filed on Aug. 2, 2018.

(51) Int. Cl.
*B32B 3/00* (2006.01)
*B42D 25/455* (2014.01)
(Continued)

(52) U.S. Cl.
CPC ............. *B42D 25/455* (2014.10); *B32B 7/12* (2013.01); *B32B 27/08* (2013.01); *B32B 27/304* (2013.01); *B32B 27/32* (2013.01); *B32B 27/36* (2013.01); *B32B 37/12* (2013.01); *B32B 38/06* (2013.01); *B42D 25/328* (2014.10); *B42D 25/46* (2014.10); *B42D 25/47* (2014.10);

(Continued)

(58) Field of Classification Search
CPC ...... B42D 25/455; B42D 25/46; B42D 25/47; B42D 25/285

See application file for complete search history.

(56) References Cited

U.S. PATENT DOCUMENTS 4,133,926 A   1/1979 Vorrier et al.
4,343,851 A   8/1982 Sheptak
(Continued)

FOREIGN PATENT DOCUMENTS

CA   2890164   7/2014
WO   2011023346   3/2011

*Primary Examiner* — Elizabeth E Mulvaney
(74) *Attorney, Agent, or Firm* — Sand, Sebolt & Wernow Co., LPA

(57) ABSTRACT

A method of processing sheet stock in the creation of plastic cards, such as gift cards or credit cards that include special effects and/or security measures. A card formed by such methods is also disclosed. The method provides for two or more dissimilar materials to be bonded together while maintaining the integrity of the card and as any graphics, security features, and/or special effects provided thereon. Thermoset and thermobond adhesive layers are placed between a first material layer and a second material layer of the sheet stock. The thermoset and thermobond adhesive layers allow the first and second material layers to move independently and to expand and contract at different rates relative to each other. The adhesive layers enable the sheet stock to be rolled up for shipping or storage and further enable the end product produced therefrom to have a planar profile.

20 Claims, 10 Drawing Sheets

(51) Int. Cl.
*B32B 7/12* (2006.01)
*B42D 25/46* (2014.01)
*B32B 27/32* (2006.01)
*B32B 27/30* (2006.01)
*B42D 25/47* (2014.01)
*B42D 25/328* (2014.01)
*B32B 27/36* (2006.01)
*G06K 19/077* (2006.01)
*B32B 27/08* (2006.01)
*B32B 37/12* (2006.01)
*B32B 38/06* (2006.01)
*B42D 25/23* (2014.01)
*B42D 25/20* (2014.01)
*B32B 38/00* (2006.01)

(52) U.S. Cl.
CPC *G06K 19/07773* (2013.01); *B32B 2038/0052* (2013.01); *B32B 2307/202* (2013.01); *B32B 2307/208* (2013.01); *B32B 2425/00* (2013.01); *B42D 25/23* (2014.10); *B42D 25/285* (2014.10)

(56) References Cited

U.S. PATENT DOCUMENTS

| | | |
|---|---|---|
| 4,519,155 A | 5/1985 | Gallagher et al. |
| 4,522,428 A | 6/1985 | Small et al. |
| 5,131,686 A | 7/1992 | Carlson |
| 5,145,548 A | 9/1992 | Yamamoto |
| 5,688,738 A | 11/1997 | Lu |
| 6,120,636 A | 9/2000 | Nilsen et al. |
| 6,256,873 B1 | 7/2001 | Tiffany, III |
| 6,581,839 B1 | 6/2003 | Lasch et al. |
| 9,623,699 B2 | 4/2017 | Ritter et al. |
| 9,731,480 B2 | 8/2017 | Bhattacharya et al. |
| 2001/0050138 A1 | 12/2001 | Fujikawa et al. |
| 2008/0102263 A1 | 5/2008 | Slywchuk et al. |
| 2009/0104410 A1 | 4/2009 | Siegel |
| 2012/0104102 A1 | 5/2012 | Rancien et al. |
| 2013/0302625 A1 | 11/2013 | Becker-Weimann et al. |
| 2015/0041545 A1 | 2/2015 | Martinez Mondejar et al. |
| 2015/0041546 A1 | 2/2015 | Herslow |
| 2015/0099082 A1 | 4/2015 | Labrie |
| 2015/0246504 A1 | 9/2015 | Liu et al. |
| 2015/0266606 A1 | 9/2015 | Wiegers et al. |
| 2015/0290958 A1 | 10/2015 | Genet et al. |
| 2016/0059532 A1 | 3/2016 | Thorogood |
| 2017/0120663 A1 | 5/2017 | Philippe et al. |
| 2018/0043726 A1* | 2/2018 | Roche ............ B42D 25/46 |
| 2019/0232712 A1* | 8/2019 | Roche ............ B42D 25/46 |

* cited by examiner

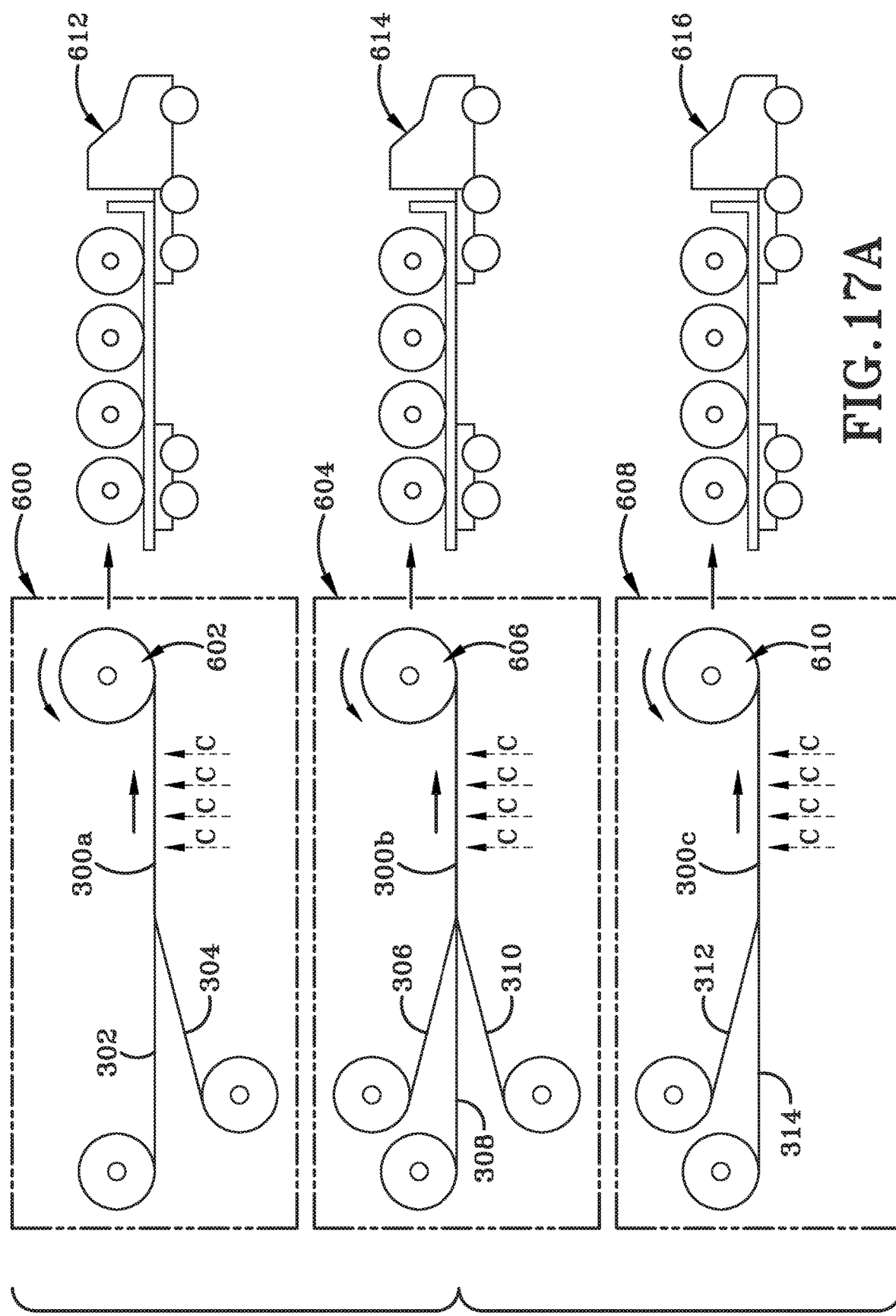

CARD WITH LAYERS ON ONE SIDE

CROSS REFERENCE TO RELATED APPLICATIONS

This application claims the benefit of U.S. Provisional Application Ser. No. 62/701,171, filed on Jul. 20, 2018, and U.S. Provisional Application Ser. No. 62/713,776, filed on Aug. 2, 2018; the disclosures of which are incorporated herein by reference.

BACKGROUND

Technical Field

The present disclosure relates to a method of producing sheet stock used in the manufacture of layered cards such as credit cards and gift cards. More particularly, the present disclosure relates to a method of roll-to-roll processing of sheet stock in order to produce layered cards. Specifically, the present disclosure relates to a multi-layered card stock and a method of producing the same where the card stock includes aesthetic enhancements and embedded security elements and, is fabricated in such a way as to enable storage and shipping of the card stock in a roll without adversely affecting the planar nature of the card produced from the rolled stock.

Background Information

In the past, the creation of roll-to-roll laminations (PreLAM) comprising multiple layers, often used for the manufacture of items such as credit and gift cards, typically uses what may be referred to as a "balanced structure". The term "balanced structure" as used herein, is used to denote a structure where there is a front to back "mirror image" or symmetry in the product. This balanced structure used in PRIOR ART cards typically involves assembling a card from a series of symmetrical layers, arranged as shown in FIGS. 1A-1C (and as discussed in greater detail layer herein). The core of these previously known cards may be termed a "split core" because the core is symmetrical about an imaginary plane that passes through a midline of the core.

FIG. 1A shows a PRIOR ART card that includes a polyvinyl chloride ("PVC") core that has a clear PVC front layer adjacent a front surface of the core and a clear PVC back layer adjacent a back surface of the core.

In instances where embedded aesthetic effects and/or security effects are desired, the laminates in these PRIOR ART cards are traditionally assembled symmetrically about the split core, i.e., by preparing a first group of layers that are to be applied adjacent a front surface of the split core and preparing a second group of layers that are to be applied adjacent a back surface of the split core. Each of the first group of layers and the second group of layers includes identical material layers assembled in an identical fashion but applied to the front and back surfaces in reverse order, i.e., as mirror images of each other. This symmetrical production and assembly is typically undertaken to avoid induction of manufacturing flaws into the card. The first group of layers and second group of layers are fused together about the core layer to form a completed card.

When it is desired for the PRIOR ART card to have a printed surface, the traditional approach is to print directly on the PVC, i.e., on the exterior surface of the front layer and/or on the exterior surface of the back layer. More recently, customers have required that special effects such as holograms, micrograms and images, be provided on their cards. However, these special effects cannot be produced using previously known "old" inks that were traditionally used to print on PVC. In an attempt to solve this problem, PRIOR ART cards have been created with a polyethylene terephthalate ("PET") layer introduced between the core and each of the PVC front layer and the PVC back layer. PET is utilized because it is effective in holding the special effects and graphics. PET has a very high glass transition temperature compared to PVC, consequently, when an attempt is made to bond PVC, and PET together, then card so formed tends to curl. This is because the PET cools at a different rate to PVC and the PET shrinks a little as it cools, while PVC does not. To address this issue, a varnish has typically been applied to both sides of the PET layer and then the PVC layers are bonded to the varnish. Varnish, however, often causes the PET to develop a milky or cloudy appearance and when the PVC is bonded to the varnish, the bonding process may muddle both the ink printed on the PET and the varnish. This tends to create blemishes and defects in the finished card. In essence, the inclusion of the varnish creates potential built-in failure layers in each card.

The inclusion of embedded security features, such as a radio-frequency identification chips ("RFID chips"), into the PRIOR ART card manufacturing process creates a separate set of problems. Previously known methods of introducing RFID chips involve utilizing a thermoplastic polymer that produced an off-gas during the bonding process. This off-gas tends to cause small bubbles to form in the finished product, giving the card an "orange-peel" effect. This "orange-peel" effect, in turn, makes the card less aesthetically pleasing or attractive. Furthermore, the industry standard for RFID chips with an antenna is a signal strength of approximately 13.56 MHz in a high frequency (HF) band with a read range of approximately 10 cm to 1 m. According to one aspect, the HF band ranges from 3-30 MHz. However, if the signal strength of the antenna is not 10 MHz or less, the materials used in the card tend to block the signal to and/or from that antenna, making the card generally unusable. Prior known cards with embedded antennas therefore tend to have a failure rate of approximately 40%, i.e., where the cards have become generally unreliable or unusable because the antenna signal is blocked.

SUMMARY

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

It should be understood that any of the terms "card", "credit card", "debit card", "bank card", "gift card", and "identification card" may be used interchangeably in this specification. These terms are all used to denote any type of flat product that is produced from multiple layers of materials, particularly plastics, that are bonded to each other and are cut to a shape and size that may be suitable to fit inside a wallet or a shirt pocket and may be used as a form of payment or identification, for example.

Accordingly, provided are methods of processing sheet stock to be used in the creation of a plastic card, such as a gift card or a credit card that may include special effects and security measures without many of the problems that plague current card manufacturing methods. Further, methods and designs for a card are provided, having two dissimilar materials bonded together while maintaining the integrity of the card itself and any graphics, security features, and/or special effects printed thereon or included therein.

The present disclosure may also provide a card having a non-mirror image front to back construction that includes a seven layers. The seven layers include a PVC layer, a first thermoset layer, a first thermobond layer, a PET layer, a second thermobond layer, a second thermoset layer, and a PVC layer. The present disclosure may further provide a card having an asymmetrical front to back construction where the PET layer is located further away from a PVC front layer than from a PVC back layer.

In one aspect, the present disclosure may provide a method of processing sheet stock comprising applying a layer of a first thermoset adhesive to one side of a first material and allowing the first thermoset adhesive to set, thereby forming a first sheet stock; applying a first layer of a first thermobond adhesive to a first side of a second material; applying a second layer of a second thermobond adhesive to a second side of the second material, and allowing the first thermobond adhesive and the second thermobond adhesive to set, thereby forming a second sheet stock; applying a layer of a second thermoset adhesive to one side of a second sheet of the first material, and allowing the second thermoset adhesive to set, thereby forming a third sheet stock; coiling one or more of the first sheet stock, the second sheet stock, and the third sheet stock into a roll.

In one aspect, the present disclosure may provide a method for roll-to-roll processing sheet stock with the steps of unrolling a first sheet of a first material from a roll and applying a first layer of thermoset adhesive to one side thereof, thereby forming a first sheet stock; unrolling a sheet of a second material, applying a first layer of thermobond adhesive to a first side thereof, and applying a second layer of thermobond adhesive to a second side thereof, thereby forming a second sheet stock; unrolling a second sheet the first material and applying a second layer of thermoset adhesive to one side thereof, thereby forming a third sheet stock; allowing each of the first and second layers of thermobond adhesive and first and second layers of thermoset adhesive to set; coiling the first sheet stock into a first roll; coiling the second sheet stock into a second roll; and coiling the third sheet stock into a third roll.

In another aspect, the present disclosure may provide a method of manufacturing sheet stock comprising the steps of applying a first adhesive layer to one side of a first material sheet; applying a second adhesive layer to a first side of a second material sheet; applying a third adhesive layer to a second side of the second material sheet; applying a fourth adhesive layer to one side of a third material; arranging the first material sheet, second material sheet, and third material sheet into a single stack wherein the first adhesive layer is adjacent the second adhesive layer and the third adhesive layer is adjacent the fourth adhesive layer; applying heat and pressure to the arranged stack; causing the first and second adhesive layer to merge into a first combined adhesive layer; causing the third and fourth adhesive layers to merge into a second combined adhesive layer; forming a single sheet stock comprising a first material layer, a first combined adhesive layer, a second material layer, a second combined adhesive layer and a third material layer; and coiling the single sheet stock into a roll. The first material sheet used in this method is polyvinyl chloride (PVC) the second material sheet is polyethylene terephthalate (PET); the first adhesive layer is a first thermoset adhesive, the second adhesive layer is a first thermobond adhesive, the third adhesive layer is a second thermobond adhesive, and the fourth adhesive layer is a second thermoset adhesive. The first thermobond adhesive and the second thermobond adhesive may be the same; and the first thermoset adhesive and the second thermoset adhesive may be the same. The method may further comprise unrolling a length of material from the roll; cutting sections of the material from the length of material unrolled from the roll; and applying personal information to the cut sections.

In one aspect, the present disclosure may provide a method of building a layered card comprising unrolling a first sheet stock comprising a first material layer and a first thermoset adhesive layer; unrolling a second sheet stock comprising a first thermobond adhesive layer, a second material layer, and a second thermobond adhesive layer; unrolling a third sheet stock comprising a second thermoset adhesive layer and a third material layer; assembling the first sheet stock, the second sheet stock, and the third sheet stock into a single stack wherein the first sheet stock is atop the second sheet stock and the second sheet stock is atop the third sheet stock, the first thermoset adhesive layer is adjacent the first thermobond adhesive layer, and the second thermoset adhesive layer is adjacent the second thermobond adhesive layer; simultaneously fusing and creating a permanent bond between the first thermoset adhesive layer to the first material layer and first thermobond adhesive layer; the first thermobond adhesive layer to the first thermoset adhesive layer and the second material layer; the second thermobond adhesive layer to the second material layer and the second thermoset adhesive layer; and the second thermoset adhesive layer to the second thermobond adhesive layer and the third material layer; creating a permanently bonded stack; and cutting the permanently bonded stack into individual card forms.

A layered card comprising a first material layer having a first side and a second side; a second material layer having a first side and a second side; a third material layer having a first side and a second side; a first thermoset adhesive layer applied to one of the first side or the second side of the first material layer; a second thermoset adhesive layer applied to one of the first side or the second side of the third material layer; a first thermobond adhesive layer applied to the first side of the second material layer and adjacent the first thermoset adhesive layer; and a second thermobond adhesive layer applied to the second side of the second material layer and adjacent the second thermoset adhesive layer.

In a further aspect, the present disclosure may provide a layered card comprising a first material layer having a first and second side; a second material layer having a first and second side; a third material layer having a first and second side; a first thermoset adhesive layer applied to one of the first or second side of the first material layer; a second thermoset adhesive layer applied to one of the first or second side of the third material layer; a first thermobond adhesive layer applied to the first side of the second material layer and adjacent the first thermoset adhesive layer; a second thermobond adhesive layer applied to the second side of the second material layer and adjacent the second thermoset adhesive layer; and one or more security devices within the card.

In yet another aspect, the present disclosure may provide a layered card comprising a first material layer having a first side and a second side; a second material layer having a first side and a second side; a third material layer having a first side and a second side; a first thermoset adhesive layer applied to one of the first side and the second side of the first material layer; a second thermoset adhesive layer applied to one of the first side and the second side of the third material layer; a first thermobond adhesive layer applied to the first side of the second material layer and adjacent the first thermoset adhesive layer; a second thermobond adhesive layer applied to the second side of the second material layer and adjacent the second thermoset adhesive layer; and one or more tagents within the card.

In accordance with another aspect, the present disclosure may provide a method of building a layered card with tagents comprising stacking a first sheet stock comprising a first material layer and a first thermoset adhesive layer on top of a second sheet stock comprising a first thermobond adhesive layer, a second material layer, and a second thermobond adhesive layer; wherein the first thermoset adhesive layer is adjacent the first thermobond adhesive layer; positioning tagents in one or more of the first thermoset adhesive layer and the first thermobond adhesive layer; stacking the first and second sheet stocks on top of a third sheet stock comprising a second thermoset adhesive layer and a third material layer, wherein the second thermobond adhesive layer is adjacent the second thermoset adhesive layer, thereby forming a layered stack; applying a magnetic field to the layered stack to align the tagents; applying heat and pressure to the layered stack; and fusing the first material layer, the first thermoset adhesive layer, the first thermobond adhesive layer, the second material layer, the second thermobond adhesive layer, the second thermoset adhesive layer and the third material layer together into a single card.

In yet another aspect, the invention may provide a layered card comprising a first material layer that is substantially planar and has a first rate of thermal expansion and contraction; a second material layer that is substantially planar and has a second rate of thermal expansion and contraction; wherein the second rate is different from the first rate; and a thermal adhesive layer separating the first material layer from the second material layer; wherein the thermal adhesive layer bonds the first material layer and the second material layer together and permits the first material layer and the second material layer to expand and contract independently of each other while remaining substantially planar and parallel to each other.

In a further aspect, the present disclosure may provide a method of bonding a layered card comprising placing a planar first material layer, having a first rate of thermal expansion and contraction, on top of a thermal adhesive layer; placing the first material layer and the thermal adhesive layer on top of a planar second material layer, wherein the second material layer has a second rate of thermal expansion and contraction; and the second rate is different to the first rate; creating a stack of layers in which the first material layer is separated from the second material layer by the thermal adhesive layer; applying heat and pressure to the stack of layers; melting the thermal adhesive layer; allowing the first material layer and the second material layer to expand independently of each other while heat is being applied to the stack of layers; bonding the first material layer and the second material to each other with the thermal adhesive layer; and maintaining a planar profile of the stack of layers. The method may further include cooling the stack of layers; and allowing the first material layer and the second material layer to contract independently of each other while the stack is cooled. The placing of the first material layer on top of the thermal adhesive layer further comprises placing the first material layer on top of a thermoset adhesive layer; and placing the first material layer and thermoset adhesive layer on top of a thermobond adhesive layer; and then placing the first material layer, the thermoset adhesive layer, and thermobond adhesive layer on top of the second material layer. The bonding includes bonding the thermoset adhesive layer to the first material layer; bonding the thermobond adhesive layer to the second material layer; and bonding the thermoset adhesive layer and the thermobond adhesive layer to each other. The melting includes melting the thermoset adhesive layer and thermobond adhesive layer and forming a single combined thermal adhesive layer. The method may further comprise forming alternating peaks and ridges in the thermoset adhesive layer and the thermobond adhesive layer; compressing the peaks and ridges upon application of heat and pressure to the stack of layers; and mixing the thermoset adhesive layer and the thermobond adhesive layer.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure.

FIG. 17A is a diagrammatic side elevation view of a first set of steps of a process for producing a card in accordance with an aspect of the present disclosure.

Similar numbers refer to similar parts throughout the drawings.

DETAILED DESCRIPTION

Provided herein is a method of manufacturing using Dynamic Thermal Balancing (DTB) to produce a credit card, gift card, key card (collectively "card", "magnetic stripe card", or "layered plastic card") or other layered plastic object. For simplicity, we will describe the construction of a single credit card, but one skilled in the art would recognize that the production process could be used to form other objects in a planar card shape or for use in building non-planar objects such as a plastic cup.

DTB is a technology that allows dissimilar material types to be thermally laminated together and maintain flatness, appearance, and functionality. It is based on the concept of matching the coefficient of thermal expansions (CTE) of the dissimilar materials with tie layers that may flow but stabilize giving the needed end properties and thereby significantly reduce the amount of rejected product.

Credit cards, gift cards and other objects of a similar type are typically produced as the combination of a number of layers of different materials that are bonded together to form a single object. In this disclosure, FIGS. 1A to 4 illustrate PRIOR ART cards and FIGS. 5A-15 illustrate cards, structures and processes in accordance with an aspect of the present disclosure.

Figure 1A:
FIG. 1A is a diagrammatic top plan view showing the layering of a first embodiment of a PRIOR ART card.
Figure 1B:
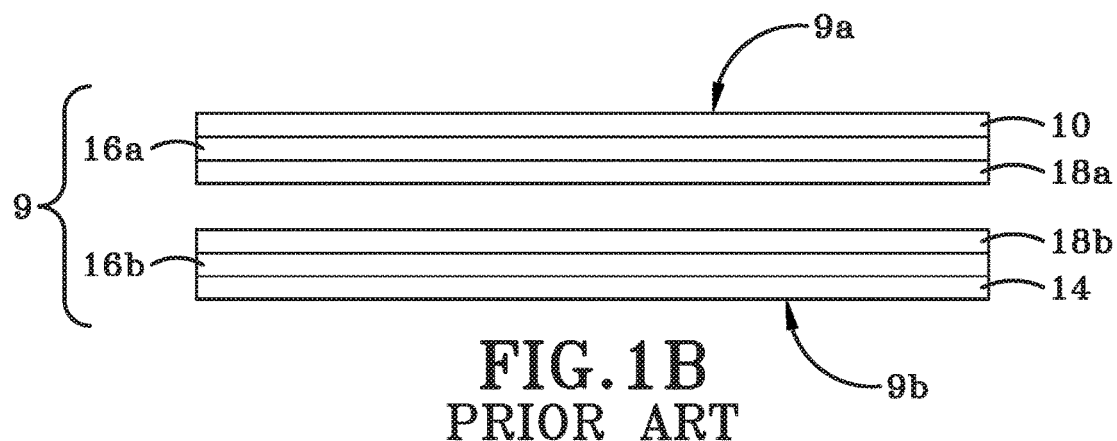
FIG. 1B is a diagrammatic top plan view showing the layering of a first half and the layering of a second half of a second embodiment of a PRIOR ART card.
Figure 1C:
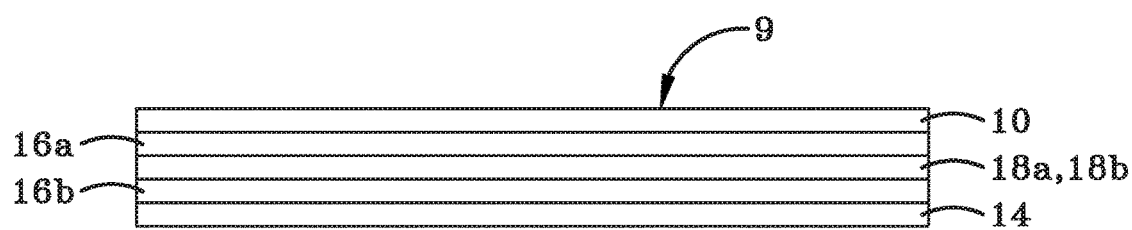
FIG. 1C is a diagrammatic top plan view showing the layering of the second embodiment of the PRIOR ART card, where the first half and the second half are bonded together.

FIGS. 1A-1C illustrate the layering of PRIOR ART cards, with a first embodiment of a PRIOR ART card being generally indicated by the reference number 8 in FIG. 1A, and a second embodiment of a PRIOR ART card being generally indicated by the reference number 9 in FIGS. 1B and 1C.

With reference to FIG. 1A, PRIOR ART card 8 is comprised of an outer polyvinyl chloride ("PVC") front layer 10, an inner PVC core 12 and an outer PVC back layer 14. Both front and back layers 10, 14 may be transparent (i.e., clear) while the core layer 12 may be translucent or opaque. Front layer 10 is located adjacent a front surface 12a of core layer 12 and back layer 14 is located adjacent a back surface 12b of core layer 12. Indicia, such as text and/or graphics (not shown) may be printed using standard ink on front surface 12a or back surface 12b of core layer 12, and then the clear front layer 10 or back layer 14 is applied thereover. (The term "standard ink" is used to denote any ink that may be used to print on PVC but which is not capable of producing special effects as will be described later herein.) For example, standard inks can include flexographic and lithographic inks, as well as UV cured inks. According to another aspect, standard inks may include more modern inks and/or printing techniques such as digital ink jet printing and laser engraving techniques.

Each layer 10-14 in PRIOR ART card 8 has its own purpose, such as providing structural support, protection, or to receive indicia thereon. In order to help PRIOR ART card 8 maintain its planar shape, card 8 must be fabricated from layers 10, 14 that are arranged symmetrically about core layer 12. The symmetry of layers 10, 12, 14 needs to be maintained so that card 8 will not tend to bend or curl. Ideally, front layer 12, core layer 12, and back layer 14 will all be of generally the same shape and size, and all three layers will expand or contract substantially identically. The symmetry is obtained by utilizing layers 10, 14 that have substantially similar properties and thickness. When layers 10, 12, 14 are of similar materials and the card 8 is constructed symmetrically about core layer 12, there tends to be less stress or relative movement between the layers, reducing bending and pitting errors in the cards 8.

FIGS. 1B and 1C show a second embodiment of a PRIOR ART card generally indicated at 9. Card 9, like card 8, is of a symmetrical types of construction. Card 9 includes a first half 9A and a second half 9B. First half 9A comprises a front layer 10, half of a split core layer 18a, and a PET layer 16a located between front layer 10 and split core layer 18a. Second half 9B comprises a back layer 14, half of a split core layer 18b, and a PET layer 16b located between back layer 14 and split core layer 18b. Front layer 10 and back layer 14 may be comprised of a clear or transparent PVC. The front surface of PET layer 16a (i.e., the surface adjacent front layer 10) may include printing, decorative designs, may be metalized, may include holograms, micrograms, images, or the like. The front surface of PET LAYER 16a is covered with the clear PVC front layer 10. The back surface of PET layer 16b (i.e., the surface adjacent back layer 14) may be over-printed and is covered with the clear PVC back layer 14.

When first half 9A and second half 9B are bonded (FIG. 1C), front layer 10 and the PET layer 16a are symmetrical with back layer 14 and PET layer 16b about core layer 18a, 18b. The mirrored or symmetrical construction can help reduce the tendency for pitting or tiny cracks to develop in the surfaces of front layer 10 and/or back layer 14 of card 9 (i.e., the symmetrical construction reduces the tendency to develop an "orange peel" surface). The use of symmetry also aids in reducing the tendency of the card 9 to become non-planar.

Figure 2:
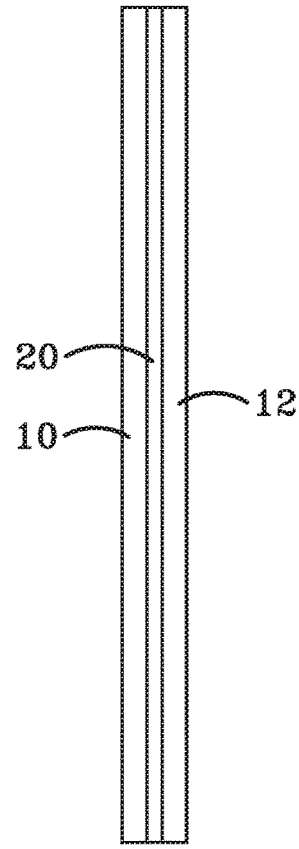
FIG. 2 is a side elevation view of the layers of an exemplary, PRIOR ART card where the core, front layer, and the back layer are straight and the edges of the various layers are aligned with each other.
Figure 3:
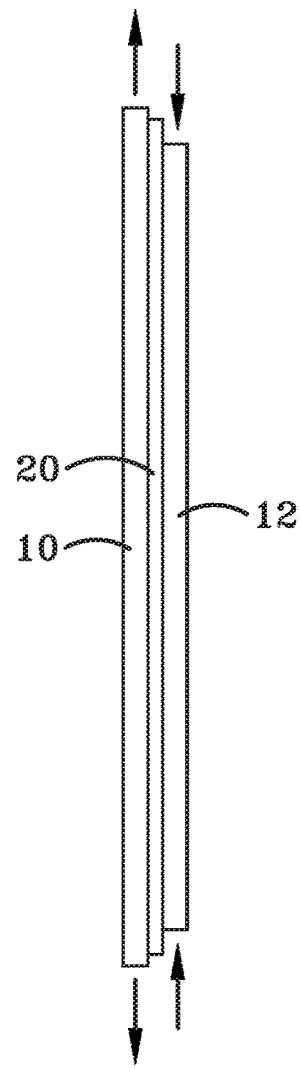
FIG. 3 is a side elevation view of the layers of the exemplary PRIOR ART card of FIG. 2, showing an example of the misalignment of the edges of the core, front layer, and back layer that may result from stresses introduced during production.
Figure 4:
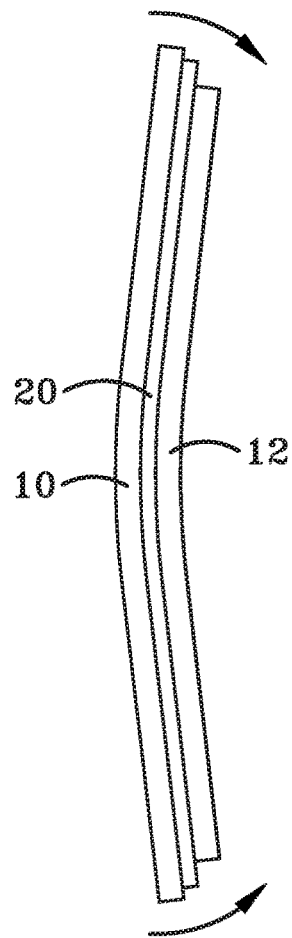
FIG. 4 is a side elevation view of the layers of the exemplary PRIOR ART card of FIG. 2, showing an example of the bending or curling introduced into the card during production.

If the layers that are to be joined together to form PRIOR ART card 8 or PRIOR ART card 9 are too dissimilar with respect to the materials used for the various layers, then the layers of card 8 or 9 may expand and contract at different rates. The difference in expansion or contraction rates may destroy the desired flatness and/or appearance of the end product. FIGS. 2-4 illustrate scenarios where stresses and bending are introduced into a card or a portion of a card because of relative variations in expansion or contraction rates between the various layers of the card.

FIG. 2 shows a first layer 10, a second layer 20, and a third layer 12. Layers 10, 20, 12 may be representative of any three layers that are formed into a card using a hydraulic press on any other similar method. If all three layers 10, 20, 12 expand or contract at similar rates, then the card structure so produced is substantially flat, and the opposed ends of the three layers will be substantially aligned with each other as is illustrated in FIG. 2.

FIG. 3 shows a situation where one or more of the first layer 10, second layer 20, and third layer 12 expand or contract at different rates and/or to different degrees. For example, if first layer 10 is PVC and third layer 12 is PET, the PET layer is known to cool at a different rate and to shrink slightly in the process. FIG. 3 shows that the first layer 10 has expanded relative to second layer 20 and third layer 12, or alternatively, second layer 20 and third layer 12 have contracted relative to first layer 10. The result may be that while the card structure still has a generally flat appearance, the ends of the three layers are not aligned with each other, i.e., the ends are not in the same plane. The end result is a card 15 that is less aesthetically pleasing than the one shown in FIG. 2.

FIG. 4 shows an instance where the rates or degrees of expansion or contraction between the three layers 10, 20, 12 are so different that the top and bottom ends of the card structure have been drawn inwardly toward each other. The card structure is bent or curved and is no longer flat. Bending or curving may occur, for example, if the first layer 10 expands relative to the third layer 12 and is thereby placed under stress, or if third layer 12 contracts relative to first layer 10, also putting the card under stress. Furthermore, if the first layer 10 or third layer 12 is transparent, any pitting resulting from any off-gas produced in the manufacturing process may be visible and give an "orange peel" look to the card structure. If the first layer 10 or third layer 12 is directly damaged by this off-gas, the card may have a rough texture as well.

PRIOR ART cards, such as cards 8 and 9 are typically manufactured from sheet stock which is produced and shipped to card manufacturers in flat sheets. This process will be described in greater detail later herein.

Figure 5A:
FIG. 5A is a diagrammatic top plan view of the layers that form a front portion and a back portion of a third embodiment of a card in accordance with the present disclosure.
Figure 5B:
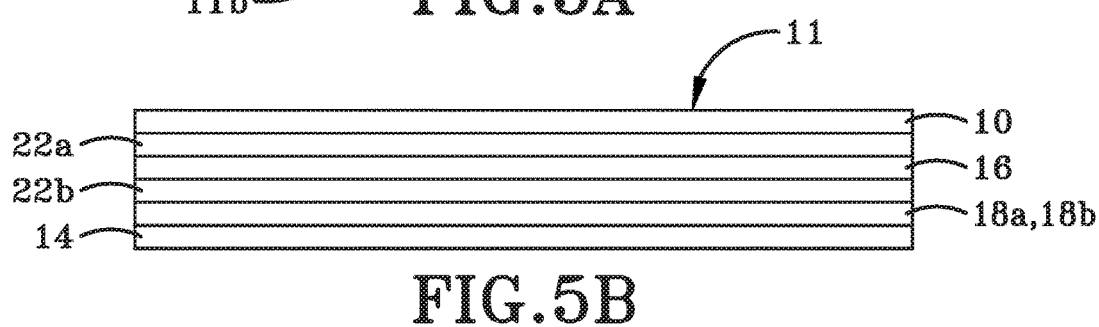
FIG. 5B is a diagrammatic top plan view showing the layering of the card of FIG. 5A, where the front portion and the back portion are bonded together.

FIG. 5A shows front portion of card 11 that is comprised of first layer 10, second layer 22a, third layer 16, a fourth layer 22b and a split core layer 18a. The back portion of card 11 is comprised of a split core layer 18b and a layer 14. When front portion and back portion are assembled into card 11 (as shown in FIG. 5B), first layer 10 forms the front layer of the card 11 and layer 14 forms that back layer of the card 11. As is evident from FIG. 5A, the front portion, and the back portion are not identical in structure. The front portion comprises four layers in addition to split core layer 18a while the back portion comprises a single layer in addition to split core layer 18b. Card 11 is therefore not symmetrical about core layer 18a, 18b.

First layer 10 of the front portion may be a transparent PVC layer, third layer 16 may be a PET layer, split core layers 18a, 18b may be opaque PVC, and layer 14 may be a transparent PVC layer. One of the features of card 11 is that the second layer 22a and fourth layer 22b may be free flowing copolymer layers. The copolymer layer 22a separates the PVC of first layer 10 from the PET of third layer 16. The copolymer layer 22b separates the PVC of split core layer 18a from the PET of third layer 16. The copolymer in second and fourth layers 22a, 22b may thermally balance between two differently expanding/contracting materials (i.e., the PVC and PET) that are located on either side of the copolymer layer. These copolymer "primer" or "thermal balance" layers 22a, 22b may absorb the differences in expansion and contraction rates and degrees between two dissimilar layers without causing cracking, bending or pitting in the associated layers. The copolymer layers are self-leveling and may "reset" into position when the heating/cooling processes utilized in the production of the front portion or of card 11 has ended. Specifically, these copolymer layers 22a, 22b can be fluid when heated and set to a solid structure when cooled below a predetermined temperature. The thermal balance layers 22a, 22b also physically isolate the PVC and PET layers from each other.

Figure 6:
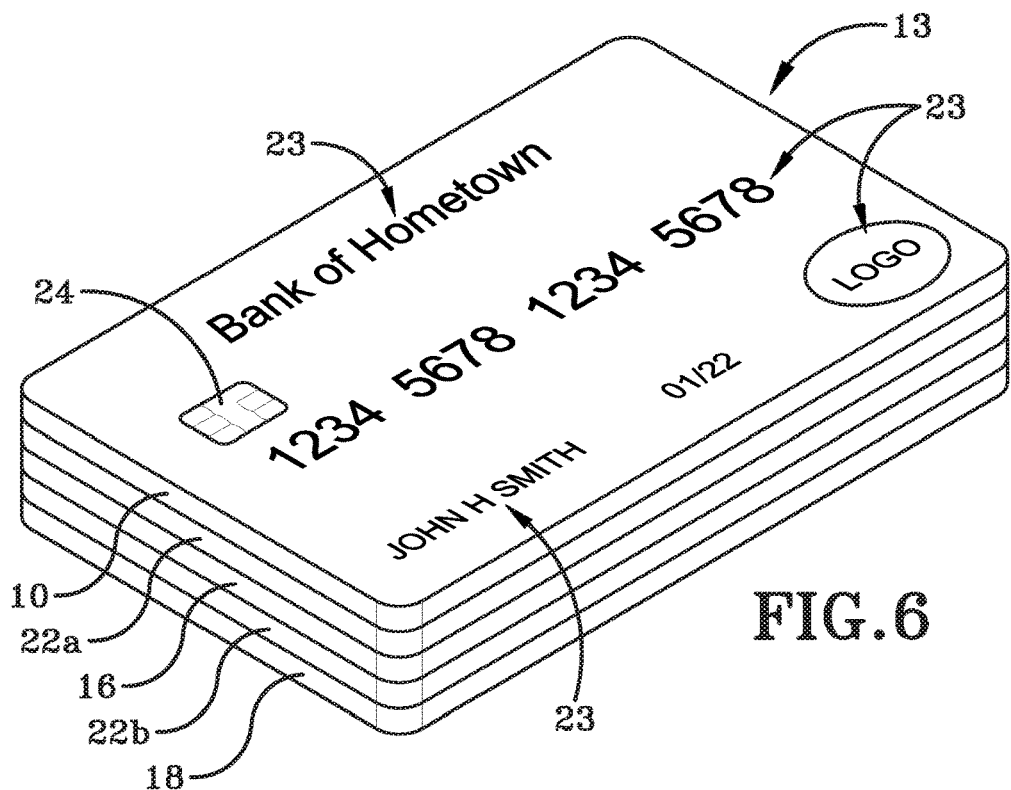
FIG. 6 is a diagrammatic top plan view of the front portion of the card of FIG. 5A.

FIG. 6 shows the front portion of card 11, generally indicated by the reference number 13. Front portion 13, in some instances, may not be bonded to the back portion (i.e., split core layer 18b and layer 14) and may be used on its own as a card. FIG. 6 shows printing of graphics and text 23 and also shows an antenna or microchip 24 incorporated into front portion 13.

Figure 7:
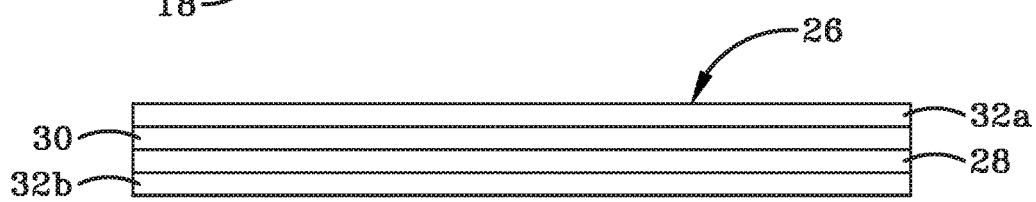
FIG. 7 is a diagrammatic top plan view of a decorative structure of a card that may be utilized instead of a PET layer according to an aspect of the present disclosure.
Figure 8:
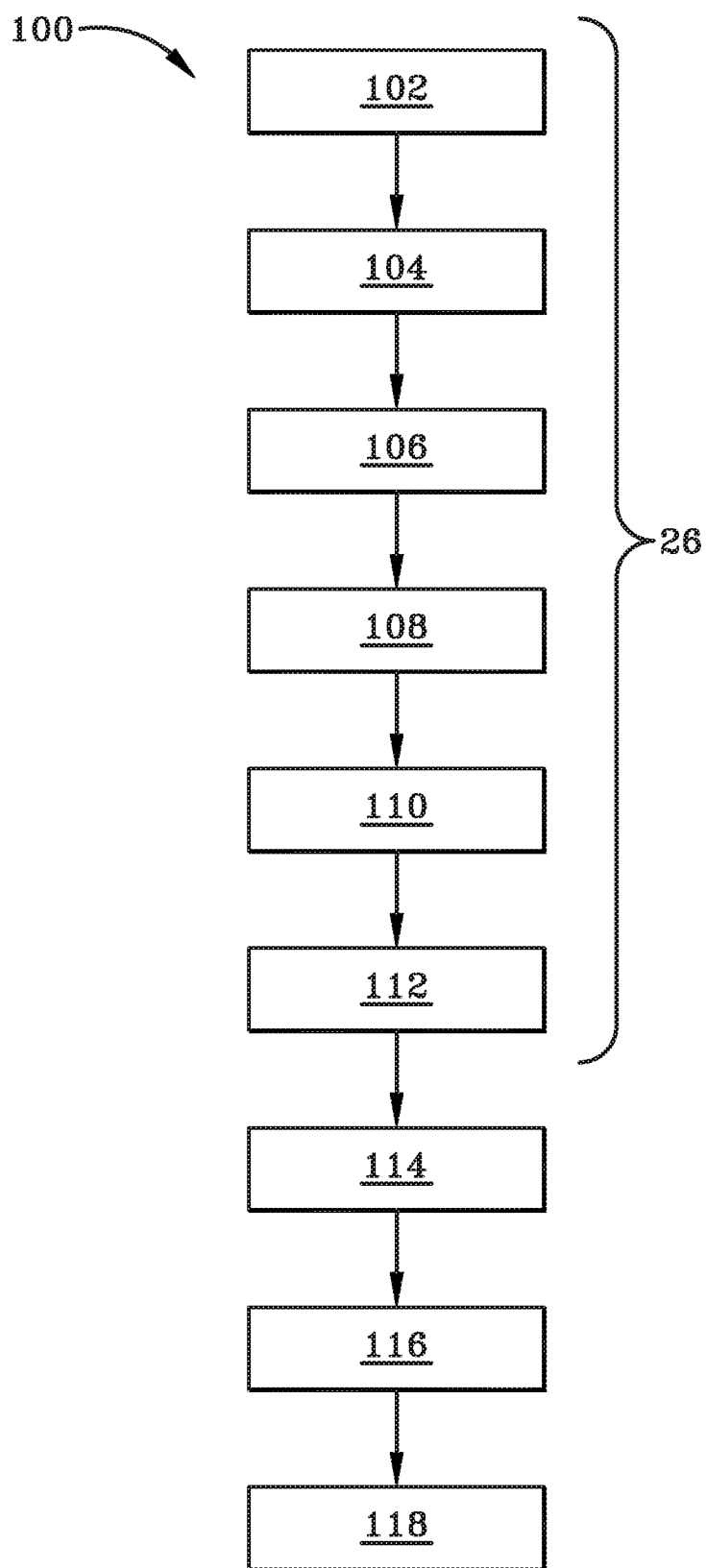
FIG. 8 is a flow chart showing an exemplary process of making a product according to an aspect of the present disclosure.

FIG. 7 shows a decorative structure 26 that may be utilized in a card 11 instead of the third layer 16, i.e., the PET layer. Alternatively, decorative structure 26 may comprise an additional layer or series of layers in a card such as card 11. Decorative structure 26 may have a layer of PET 28 that comprises a core layer. PET layer 28 may have a decorative layer 30 applied thereto. Decorative layer 30 may comprise metal, aluminum, a hologram, logo, brushed metal, vapor deposition metal layer, etc. The decorative layer 30 may applied in such a way (such as by vapor deposition) and in such an amount so as to appear as a complete layer, but may include microscopic gaps. The microscopic gaps may assist in preventing the decorative layer from blocking or reflecting signals an antenna or microchip 24 transmits or receives. In other words, the microscopic gaps may reduce the likelihood that the antenna signal will be attenuated. The presence of these gaps may therefore increase the effective range of the card so that the card may be used as a proximity form of payment instead of having to be swiped or having the chip end inserted into a payment device. In other words, providing microscopic gaps in the decorative layer 30 may make the card more usable for a "tap" type of transaction.

Previously known cards that were manufactured with a metal layer over an antenna suffered the drawback that the antenna signal was attenuated to the point that many PRIOR ART cards could not effectively be used in a proximity payment method. It should also be noted that the bonding of the thermoset and thermobond adhesive layers also leaves space within card 300 through which the antenna signal may travel. When the various layers of card 300 are glued together using the thermoset and thermobond adhesives, just enough adhesive is utilized to keep the adjacent layers together and then they coalesce when the layers are put into a hydraulic press.

A first layer 32a may be applied above the decorative layer 30 and a second layer 32b may be applied below PET layer 28. Layers 32a, 32b may comprise a thermoplastic copolymer, such as Ethylene Ethyl Acrylate ("EEA"). This, in effect, may result in PET layer 28 with decorative layer 30 being encapsulated between the two copolymer layers 32a, 32b. According to one aspect, each copolymer layer 32a, 32b may have a thickness of about 0.5 to 0.6 mm. According to another aspect, each copolymer layer 32a, 32b may be approximately 1 mm in thickness.

The present disclosure may therefore provide a card with a copolymer, such as a thermoplastic, with one non-limiting example being Ethylene Ethyl Acrylate Copolymer ("EEA"), between two disparate layers to allow the layers to move independently of each other during production while still forming a planar/non-distorted card. The present disclosure may also provide a flexible polymer between two adjacent layers to allow the polymer to prevent distortion between the two adjacent layers as they thermally expand or contract during production of a card or other such object.

According to one aspect, each copolymer layer 32a, 32b may be formed of EEA in a matrix of ethylene provided as 15% EEA and 85% low density polyethylene ("LOPE"). However, any other suitable copolymers of ethylene may be used. Additionally, polyolefins may also be used for layers 32a, 32b. A suitable polyolefin may be polypropylene. Alternatively, Ethylene Acrylic Acid (EAA) or d-ethylene vinyl acetate (EVA) may be substituted for the EEA.

One feature of the copolymer layers 32a, 32b are that they may bond to polar substrates, to metals, to ester groups, to vinyl groups, etc. The PET layer 28 may therefore be replaced with a layer of a different material such as metal. Such a metal layer may directly incorporate the features of the decorative layer 30 (and therefore the decorative layer 30 illustrated in FIG. 7 may be omitted from the structure).

By completely isolating the PET layer 28 utilizing the copolymer layers 32a, 32b, the variation in expansion and contraction of any PVC layer(s) (e.g. 10, 14) relative to the PET layer 28 may be fully absorbed and compensated for by the copolymer layers 32a, 32b. Further, according to one aspect, EEA may be used as the copolymer in layers 32a, 32b because it is a thermal plastic and is malleable enough to move and flow when different expansion and contraction rate products are located on either side of the EEA layer. The EEA may act as a primer or thermal barrier to provide a buffer between the plastics on either side of the EEA layer 32a, 32b and will tend to not transfer any movement forces from one side of the EEA layer to the other during heating or cooling of the card structure. This isolation of the two opposite sides of the EEA around the PET layer 28 also prevents pitting by "filling in" any voids as the product cools again so that looking through a clear PVC layer, such as first layer 10, no roughness in the layer is observed.

During production of a card, however, a roll of PET may be utilized instead of flat sheet stock. The PET may have a semicrystalline material and may be transparent or opaque and white depending on its structure and particle size. If PET has a particle size of less than 500 nm it tends to be transparent; if the particle size is up to a few micrometers then the PET tends to be opaque and white. The production of card 13 (FIG. 6) will be described hereafter except that the decorative structure 26 is utilized instead of PET layer 16. The creation of card stock with a PET core 28, a decorative layer 30, two copolymer layers 32a, 32b, two adhesive copolymer layers 22a, 22b, a clear PVC cover layer 10, and PVC layer 18 may have the steps shown in the flow chart of FIG. 8 and is further referenced herein as process or method 100. The first step 102 in process 100 is to provide the PET core 28 material, which is provided as a roll of PET. Second, as the PET core 28 material is unrolled, a decorative layer 30 is applied to the PET core 28 as step 104. Then, a copolymer layer 32a is applied over the decorated layer 30 in step 106. The application of the copolymer layer 32a may be achieved by an extrusion process, but is not limited to such. After the copolymer layer 32a is applied, a cooling drum cools a first side of the structure, indicated as step 108 in the process. The next step in the process 100 is to then to apply a copolymer layer 32b to the side of the PET core 28 opposite to that upon which decorative layer 30 has been applied. This is followed by step 112 which comprises cooling the second copolymer layer 32b with a cooling drum. At this point in the production process, the result of method 100 is the stock decorative structure 26 shown in FIG. 7.

The next step 114 in process 100 comprises applying an adhesive copolymer layer 22 to the decorative structure 26 and over copolymer layers 32a and 32b. Step 116 is to then laminate the decorative structure 26 with a clear PVC layer (not shown) through a laminating dip section of the process and then to wind the laminated product back into a roll (Step 118). The clear PVC layer which is used in the lamination step 116 differs from the PVC front layer 10 and/or from the PVC back layer 14 as these layers will be applied during a finishing process 200 shown in FIG. 9 and discussed below. This roll produced through steps 102 to 118 is now considered a pre-laminated ("PreLAM") roll that will be supplied to a card manufacture for finishing.

The use of EEA as the copolymer layers 32a, 32b makes it possible to fabricate the PreLAM as a roll. If the decorative structure 26 was fabricated without using EEA as the copolymer layers 32a, 32b, then the PreLAM might not be able to be formed into a roll and the PreLAM might have to be shipped a sheet. PreLAM's without EEA may have to be formed as sheets in order to reduce the tendency of the structure to curl and develop a roll set (i.e., a curvature that is difficult to overcome) when the PreLAM is cut into cards. The softer EEA as a copolymer layer 32 allows the cards to more easily go from a roll form to a flat planar form that is required for the cards.

Figure 9:
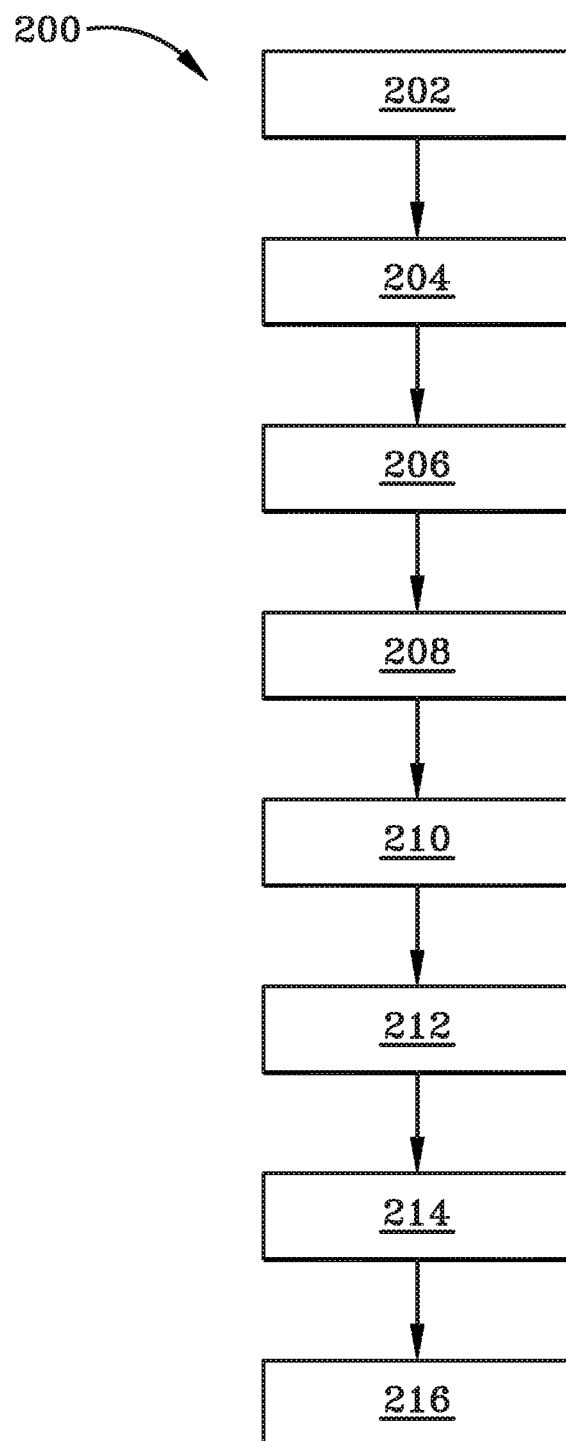
FIG. 9 is a flow chart showing further processing of the product of the flow chart of FIG. 8.

FIG. 9 is a flow chart that illustrates a process or method 200 of finishing a card in accordance with an aspect of the disclosure. This process 200 may be representative of a process performed by a card manufacturer and may vary slightly depending on the type of card being fabricated (e.g. credit card vs gift card vs loyalty card vs ID card, etc. . . . ). Minor deviations from the representative finishing process 200 shown herein to account for the desired end product are considered as normal and part of the overall scope of the disclosure herein.

The finishing process 200 may begin with the PreLAM roll produced in step 118 of process 100 described above. The first step (step 202) in finishing process 200 is to ship, deliver, or to otherwise provide a roll of PreLAM to a card manufacturer. In some instances, the producer of the PreLAM may also be the end card manufacturer, but it is not required that these be the same person/entity. The PreLAM is considered raw stock at this point and is made up of the decorative structure 26 with the adhesive layer and laminated clear PVC layer thereover. The PreLAM is considered raw because it is ready to be individualized and cut into individual cards and to be provided with objects such as names of account holders or card holders, account numbers, ID information, banking information, and the like.

The next step 204 in the finishing process 200 is to print graphics and/or text to the top of the PreLAM directly on PVC layer that was applied in step 116. Next, the PreLAM may be die cut to provide an area to receive an antenna and/or chip 24 thereon. The provision of the antenna and/or chip 24 occurs later in the process. The die cut is indicated as step 206. The next step requires a second PVC core sheet, that will ultimately form second core layer 18b, be bonded with a clear PVC layer 14. This PVC core sheet that will form layer 18b is provided and graphics and/or text may be printed thereon and this is collectively indicated as step 208. Since step 208 involves a sheet separate from the PreLAM, the step may be performed separately and/or simultaneously with other steps in this process 200.

Next, in step 210, the layers to assemble into the final card form are collated. According to one embodiment, the layers to collate are a clear PVC front layer 10, the PreLAM, the antenna and/or chip 24 that is to be inserted into the card, the second PVC sheet from step 206, and a clear PVC back layer 14.

The layers collated in step 210 may then be inserted into and compressed by a hydraulic press or the like. Heat generated during the pressing process causes the flow stabilizing copolymer layers 32a, 32b, e.g., the EEA layers, to act to isolate the printed back core layer and the PET decorated structure from each other so that the card remains planar (i.e., flat). The heat also causes the translucent layers of copolymer become clear and unclouded. The pressing of the collated layers is indicated as step 212 of process 200. The thermoplastic copolymer layers 32a, 32b also help to absorb any relative changes in the PVC and PET layers and therefore the end product remains flat and intact after hydraulic pressing.

The sheet of printed and bonded stock produced in step 212 may then cut into individual cards in step 214. Step 216 which follows step 214, may include embossing the cards to provide raised letters, numbers, and/or graphics on the card. By way of non-limiting examples, the embossing may imprint the card with the name of the cardholder, the card's expiration date, account numbers, etc. During step 216, the card may also have a magnetic strip and/or any logos and/or holograms applied thereto.

Process 200 allows for card construction that does not need to be symmetrical or mirrored since the copolymer layers 32a, 32b allows for the PET and PVC layers within the card to move independently of each other. In other words, the copolymers allow the PET and PVC layers within the card to contract or expand at different rates and to different degrees independent of each other during heating and cooling steps of the process 200. The back portion of the card 11 may therefore be simplified instead of having to mirror the construction of the front portion thereof.

With reference to FIGS. 10-14, an alternative card design is shown which may further streamline the card building process and may create a better quality and more aesthetically pleasing end product. Specifically, the new card, generally indicated as 300 in FIG. 10, may have a seven layer design. The seven layers includes a clear PVC cover layer 302, a first thermoset adhesive layer 304, a first thermobond adhesive layer 306, a printed PET layer 308, a second thermobond adhesive layer 310, a second thermoset adhesive layer 312, and a PVC core layer 314.

Suitable materials to use as the first thermoset adhesive layer 304 and second thermoset adhesive layer 312 can generally be any polyurethane reactive (PUR) adhesive, including those that are water-based, solvent-based, or solvent-less. Such PUR adhesive systems are produced and/or commercially available from companies such as The Dow Chemical Company (DOW), CoimGroup (COIM), and/or Henkel AG & Company, KGaA (HENKEL). According to another aspect, other suitable thermoplastic adhesives may be EEA based copolymers, such as those produced by and/or commercially available from DOW.

According to one aspect, EEA copolymers may be used for the thermoset adhesive layers 304, 312 due to their properties relative to other layers within card 300. Specifically EEA has a melting temperature of 210° F. (approximately 98.9° C.) which is suitably high to prevent the EEA from flowing too rapidly in the liquid state and EEA further does not react with or degrade the PVC layers 302, 314. One example of a particular EEA copolymer suitable for use as thermoset adhesive layers 304, 312 is AMPLIFY™ EA 100. Functional Polymer produced by and/or commercially available from DOW.

According to one aspect, first thermobond adhesive layer 306 and second thermobond adhesive layer 310 may be a bonding and leveling polymer. Suitable materials to use as the first thermobond adhesive layer 306 and second thermobond adhesive layer 310 include Novacote SF-783-A PU with co-reactant CA-379 PU (Novacote), produced by and/or commercially available from COIM. While other suitable copolymers exist, Novacote provides a suitable laminate for printed or unprinted, metalized, and/or transparent structures consisting of PET, amongst others.

According to one aspect, the layers of card 300, specifically the thermoset adhesive layers 304, 312 and the thermobond adhesive layers 306, 310, are arranged in the presented order with thermoset layers 304, 312 adjacent PVC layers 302, 314 on one side and adjacent thermobond adhesive layers 306, 310 on an opposite side to maximize the flatness of the final card 300. Specifically, the layers may be arranged according to the melting temperature of each material, moving from materials with higher melting temperatures to materials with lower melting temperatures to maximize the absorption of any relative changes in the PVC and PET layers during hydraulic pressing. Accordingly, the layers are arranged to maintain the thermoset adhesive layers 304, 312 adjacent the PVC layers 302, 314 and the thermobond adhesive layers 306, 310 adjacent the PET layer 308.

Figure 10:
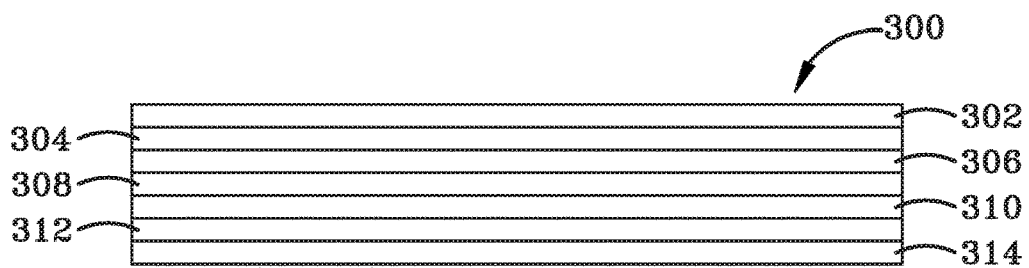
FIG. 10 is a diagrammatic top plan view of a second embodiment of a layered card in accordance with an aspect of the present disclosure.
Figure 11:
FIG. 11 is a diagrammatic top plan view of a front portion of the card shown in FIG. 10.
Figure 12:
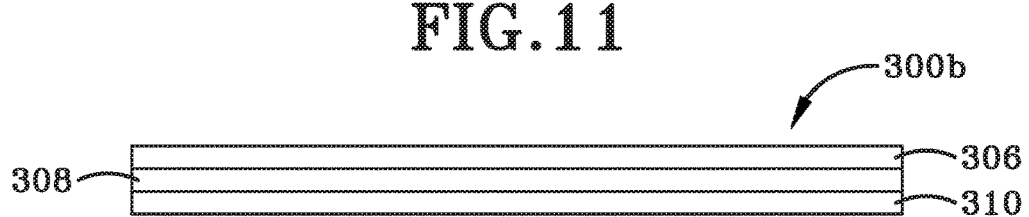
FIG. 12 is a diagrammatic top plan view of a back portion of the card shown in FIG. 10.
Figure 13:
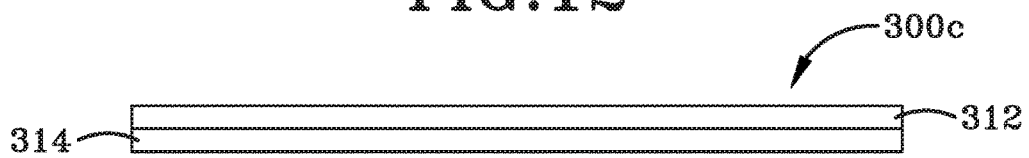
FIG. 13 is a diagrammatic top plan view of a third portion of the card shown in FIG. 10.

With reference to FIGS. 10-14, card 300 (FIG. 10) may be constructed in three separate parts, namely, a front portion 300a (FIG. 11), a back portion 300b (FIG. 12), and a middle portion 300c (FIG. 13). Front portion 300a comprises the clear PVC cover 302 and the first thermoset adhesive layer 304 (FIG. 11). Middle portion 300b comprises the printed PET layer 308 with first thermobond adhesive layer 306 on one side and second thermobond adhesive layer 310 on the other side (FIG. 12). Middle portion 300c can further include a deposition layer or embossed layer between the PET layer 308 and the first thermobond adhesive layer 306, similar to decorative layer 30 from card 13. Back portion 300c comprises the PVC core layer 314 combined with second thermoset adhesive layer 312.

Much like process 100, the construction of card 300 may include producing each separate portion 300a, 300b, 300c to be produced in large quantities as separate sheet stocks (with front portion 300a representing a first sheet stock, middle portion 300b representing a second sheet stock, and back portion 300c representing a third sheet stock). These sheet stocks may be fabricated by extruding or otherwise applying the adhesive layers 304, 306, 310, and 312 to the associated PVC layers 302, 314 and/or PET layer 308. During the finishing of card 300 (discussed below as process 400), front portion 300a, middle portion 300b, and back portion 300c may be assembled together to form the completed card 300 that is illustrated in FIG. 10.

Figure 14:
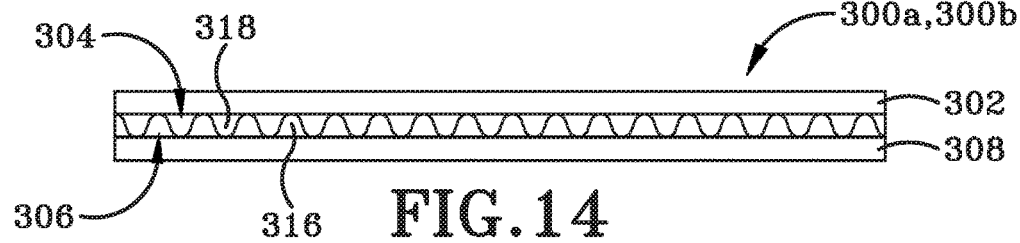
FIG. 14 is a diagrammatic top plan view of an alternative front portion of the card shown in FIG. 10.

FIG. 14 illustrates the introduction of first thermoset layer 304 and thermobond layer 306 between PVC cover layer 302 and the PET layer 308 during assembly of card 300. The introduction of first thermoset layer 304 and thermobond layer 306 between cover layer 302 and layer 308 creates a bond that provides substantially 100% coverage on both the PVC layer 302 and the PET layer 308. Specifically, when the first thermoset and first thermobond layers 304, 306 are applied one on top of the other, they may create a series of peaks 316 and valleys 318 where the adhesives intersect. These peaks 316 and valleys 318 may be created by embossing the first thermobond layer 306 with a pattern of peaks 316 and valley 318 which are then filled in by the marriage of the first thermoset adhesive layer 304 and the first thermobond adhesive layer 306. This arrangement may create a geometric matrix of bonding points within the first thermoset adhesive layer 304 and first thermobond adhesive layer 306 which may allow for expansion and/or contraction of the card layers during manufacturing. The peaks 316 and valleys 318 may reach each of the PVC and PET layers 302, 308 and thereby provide a light bond that may hold the layers in position relative to each other during construction of the card 300. Then, when heat and pressure are applied during the finishing process 400, as discussed below, the peaks 316 and valleys 318 will be compressed and both the first thermoset and first thermobond 304, 306 adhesives will flow into all the interstitial spaces between the PVC and PET layers 302, 308 providing full coverage therebetween. This arrangement results in a very tight bond that secures the layers of the card 300 together. Although described as peaks 316 and valleys 318, it will be understood that other geometric patterns can be applied, without limitation.

Card 300 may further include security measures embedded within the layers of card 300. The first of these security measures may be RFID chips and/or antennas (such as antenna/chip 24 shown in FIG. 6). The inclusion of thermoset and thermobond adhesives, and the clarity imparted from the bonds between the thermoset and thermobond adhesives, makes it possible for embedded RFID chips or antennas to operate well, i.e., signals are transferred readily through the layers. As indicated earlier herein, previously known cards and methods of production have resulted in cards having a signal strength for embedded chips/antennas in a range of from about 8-14 MHz, with an industry standard of approximately 13.56 MHz. Signal strength is measured as the power of the signal detected/detectable within the card. If the signal is not 10 MHz or less, PRIOR ART cards tend to block the signal to and/or from that antenna and the card is not useable. The clarity provided by the thermoset/thermobond combination of card 300 allows for a signal strength of 1-2 MHz, which translates into a very strong signal that is generally unaffected by the card 300 itself. A lower number for signal strength is desired; the strength signifies the speed at which the signal moves through the vapor deposition of the card.

Additional security measures often found on or in layered cards, especially credit cards and/or identification cards, are holograms or other three dimensional graphics. Often these measures are included to help detect counterfeit cards and/or to detect post-production modification of cards. PRIOR ART practices have involved printing these security features directly on exterior surface of the PRIOR ART cards. Printing security features on the exterior surface may, of course, allow those security features to be scraped off or be materially altered.

The layered design of cards 300, on the other hand, particularly the inclusion of a PET layer 308 with the thermoset/thermobond adhesive layers 304, 306, 310, and 312, substantially prevents such physical alterations. At a minimum, the structure of cards 300 renders it obvious that alterations were made to the card. As discussed herein, printing may be done directly on the PET layer 308, with or without overprinting on the outer PVC layer 302. If security printing, such as holograms, micrograms, or three dimensional graphics, are printed directly on the PET layer 308, alterations would require the removal of the PVC layer 302 as well as the breakage of the extremely strong bond between the thermoset adhesive 304 and thermobond adhesive 308. Further, as the thermoset/thermobond combination results in a card with exceptional clarity, the printed PET layer 308 is highly visible, making these security measures equally visible, highly effective, and tamper resistant.

Figure 14A:
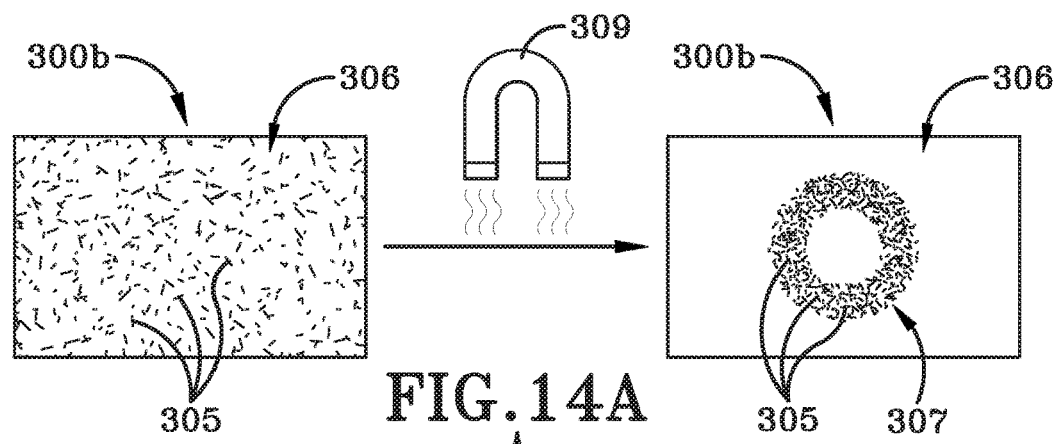
FIG. 14A is a diagrammatic top view of an adhesive layer that incorporates tagents therein and showing the tagents being arranged by a magnet into a pattern during processing of the card structure.

Another type of security measure that is enabled through the use of the thermoset and thermobond adhesive layers, 304, 306 and 310, 312 is the use of tangent lines. These lines may be fabricated from metallic, semi-metallic, or other reflective materials 305 (FIG. 14A) that are ferromagnetic or have ferromagnetic properties. During production, alignment of the tangent lines, known as tagents 307, may be accomplished through use of a strong B-field, or magnetic field generated by a magnet 309. (FIG. 14A shows a horseshoe magnet but it will be understood that any type of magnet may be utilized to organize the tagents 305 into a pattern.) The magnetic field produced by magnet 309 may be used to orient the tagents 305 directly within the adhesive layers, 304, 306, 310, 312, and/or directly on the PET layer 308. FIG. 14A shows tagents 305 in first thermobond adhesive layer 306. The tagents 305 are initially located randomly within layer 306. After exposure to a magnetic field produced by any type of magnet 309, the tagents 305 are organized into a pattern 307 within layer 306. The tagents 305 are exposed to the magnetic field prior to subjecting the stacked first portion 300a, second portion 300b, and third portion 300c to heat and pressure to bond the various layers to each other. The pattern of the tagents is fixed during bonding and may subsequently be used as a security measure/identifier. It will be understood that while FIG. 14A shows a circular pattern 307 of tagents 305, the tagents 305 may be arranged in any desired pattern within any of the aforementioned layers of card 300. The tagents are only visible under an electromagnetic field (EMF) light and may be arranged to reflect the EMF light in specific directions and/or patterns. This type of security involves placing these tagents within the layers of the card itself. Specifically, the tagents may be printed or otherwise placed directly on the PET layer 308 and oriented prior to applying the thermobond adhesive layers 306, 310. Alternatively, the tagents may be disposed within the thermoset and/or thermobond adhesive layers, 304, 306 and 310, 312 and magnetically oriented prior to pressing the layers in step 422 of process 400, discussed below. Once the card has been processed completely, EMF light passing through the layers of the card may flow onto the tagents, and the tagents reflect the light back through the card layers in a specific pattern or direction.

According to one aspect, tagents may be non-planar and may create an image that appears to be offset when viewed at different angles. According to another aspect, the tagents may have curved facets that may be oriented in such a manner as to create a spherical lens or spherical reflective surfaces on the facets that may allow the reflections to appear as three-dimensional images within the card. Light may be allowed to flow into the material of the card 300 and onto a back side of the facets of the tagents to light them up. If the light is shown through the adhesive, the facets tend to light up even better. The thermobond adhesives tend to melt into the facets of the tagents and the adhesive helps the facets to light up well because of the clarity of the adhesive and because of the low conductivity of the adhesive.

According to one aspect, the tagents may have a length and/or a height that is less than the total thickness of the layer in which they are placed. This may allow the placement of the tagents to vary in depth within the layer to further enhance or provide three dimensional effects to the card. By way of one non-limiting example, the tagents may have a length of approximately 2 microns while the adhesive layers 304, 306 and 310, 312 may have a total thickness of approximately 20 microns. Thus, the tagents may be arranged at any depth within that 20 micron thickness. The specific placement may then give the tagents a depth of field in their reflective properties.

According to another aspect, an effect similar to the inclusion of tagents may involve the use of vapor deposition of metal onto the PET layer 308 and/or in the adhesive layers 304, 306 and 310, 312. The metal vapor may be applied in a variety of different thicknesses such that an image may be created using the deposited metal layer. According to this aspect, vapor deposition may be applied on the back side of the PET layer 308 or in adhesive layers 310 and/or 312. This process may be performed to protect any printing, graphics, holograms and any other security measures or three-dimensional images that have been applied to the opposite or front side of PET layer 308.

According to another aspect, the thermoset and thermobond adhesive layers 304, 306, 310, and 312, may include holograms within the adhesive layers themselves. These holograms may be formed within the adhesive as a security measure, with the holograms being protected similar to holograms and/or security measures placed on the PET layer 308. Further, these holograms may be used in conjunction with tagents and/or other security features to give an additional layer of counterfeit or illegal modification protection.

Card 300 imparts a number of advantages over the current designs in that the use of both a thermoset adhesive and a thermobond adhesive joins dissimilar materials, such as the dissimilar PVC layers 302, 314 and PET layer 308. This joining of dissimilar materials may be accomplished without pitting, cracking, peeling, bending, curling, or other flaws being created within card 300 because of the different cooling rates and transition temperatures of the different materials used in card 300. Thermoset adhesives do not tend to produce an off-gas and therefore the tendency for an "orange-peel" effect in the card 300 is greatly reduced. Additionally, the PET layer 308 may be printed with text, graphics, special effects, or any other desired embellishments prior to adding the thermobond adhesive layers 306, 310. During production of card 300, there may be a vapor deposition of metal and this deposition occurs sufficiently rapidly that the material does not tend to coalesce. In other words, the vapor deposition does not fully cover the surface upon which it is deposited. Spaces tend to be left between the "dots" of metal that are deposited and this enables signals from any antenna provided in card 300 to get through the deposited metal layer.

The outer PVC layers, both cover 302 and core 308 may also be printed or embellished as desired utilizing existing printing technology and materials. This may eliminate the need for additional layers being provided in a card specifically for printing thereon. This may further result in reduced cost of manufacture as older inks that were not previously suitable for printing due to smearing, marring, or other errors introduced during fabrication may now be utilized within card 300. Thermoset and thermobond adhesive layers 304, 306, 310, and 312 prevent smearing and marring of these inks during card production.

An additional advantage is that the PET layer 308 may be printed while the PVC cover layer 302 may be overprinted (i.e. printed with identical markings that line up with the printing on the PET layer). This process may create better quality and more aesthetically pleasing text, graphics, and/or images on the card 300. Finally, the thermoset and thermobond adhesive layers 304, 306, 310, and 312 work in concert to create very tight bonds to the PVC, PET and to each other, while imparting little to no resistance to light waves or radio frequency waves passing through these layers. This in turn allows for security features to be embedded or otherwise placed deep within the card itself, thereby protecting them from removal or alteration.

Although card has been described herein as including layers of PVC and/or PET, it will be understood that card 300 may, alternatively, be fabricated with other materials, including other similar or dissimilar layers, without deviation from the scope described herein. According to one aspect, the core of card 300 may be metal or metal foil.

Figure 15:
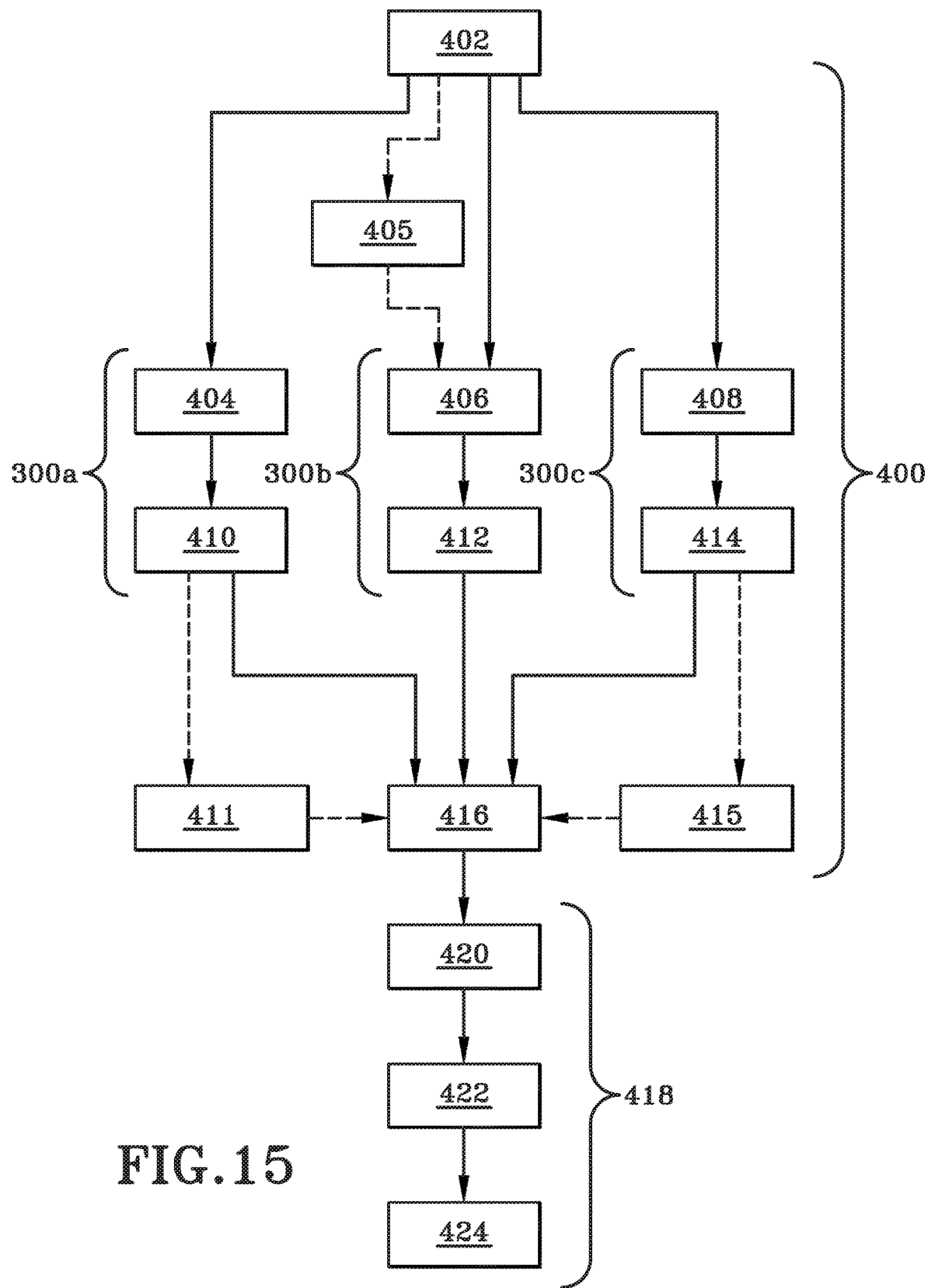
FIG. 15 is a flow chart showing a process of making the second embodiment of the card shown in FIG. 10 and according to an aspect of the present disclosure.

FIG. 15 shows a flow chart illustrating a process 400 for the creation and finishing of card 300 from raw materials. First, in step 402, a clear PVC stock (which will later become cover layer 302), a PET stock (which later becomes PET layer 308), and PVC core stock (which later becomes PVC core layer 314), are provided.

The next three steps, 404, 406, and 408, may be completed separately and/or simultaneously as each step involves only one of the previously mentioned stock products. Step 404 involves coating the clear PVC stock on one side with the thermoset adhesive layer 304, creating front portion 300a of card 300. Step 406 involves coating the PET on both sides with the first and second thermobond adhesive layers 306, 310, creating middle portion 300b of card 300. Step 408 involves coating PVC core on one side with the second thermoset adhesive layer 312, creating back portion 300c of card 300. If an optional step of printing on the PET stock is to be performed, it would be performed prior to the coating step 406. This optional and intermediate printing step may also include the printing and/or installation of security measures, as discussed above.

According to one aspect, the coating of the PET layer 308 with the thermobond adhesive layers 306, 310 that occurs during step 406 gives the PET layer 308 a frosted or clouded appearance. This is due to occlusions within the adhesive that will later be eliminated with the addition of heat in the later pressing step (i.e., step 422 that is discussed below).

Following the coating steps 404, 406, and 408, each of the front portion 300a, middle portion 300b, and back portion 300c is cooled in steps 410, 412, and 414, respectively to set the adhesive layers 304, 306, 310, and 312. According to one aspect, the cooling steps 410, 412, and 414 may be performed by one or more cooling drums.

Once each front portion 300a, back portion 300b, and middle portion 300c is cooled, optional steps 411 (for front portion 300a) and 415 (for back portion 300c) may be performed. Optional steps 411 and 415 include printing directly on PVC cover layer 302 or PVC core layer 314, respectively, any text, graphics, or images as desired. If it is desirous for middle portion 300b to be printed, optional printing step 405 would have been previously performed prior to applying the thermobond adhesive layers 306, 310, therefore middle portion 300b moves directly from the cooling step 412 to next step 416.

Once the adhesive layers are fully set in cooling steps 410, 412, and 414, and sections 300a and/or 300c are printed as desired, each of front portion 300a, back portion 300b, and middle portion 300c, (i.e. first, second, and third sheet stocks) may be coiled into separate rolls that may then be stored or prepared for shipping to a card manufacturer. The coiling and storing/preparing for shipment is indicated as step 416.

Alternatively, if the stock producer is also a manufacturer of the end cards 300, the individual rolls of sheet stock may immediately proceed into the finishing process (indicated as process 418), skipping coiling step 416.

The first step in finishing process 418, indicated as step 420, is to collate the sections in the appropriate order, with front portion 300a layered atop middle portion 300b, which is in turn placed atop back portion 300c. If front portion 300a is overprinted with identical markings as PET layer 308, it is important to ensure proper placement and alignment of front portion 300a over middle portion 300b prior to moving to step 422.

In step 422, the collated layers are placed into a press where heat and pressure cause the thermoset and thermobond adhesive layers 304, 306 to coalesce into a clear, tightly bonded layer. Similarly, the thermoset and thermobond adhesive layers 310, 312 will coalesce into a clear, tightly bonded layer. The bonds in these tightly bonded layers may have as much as ten times the strength of the bonds created in PRIOR ART cards by previously known manufacturing processes. The bonds created in the present process give card 300 significant strength and durability. Effectively, the thermoset adhesive 304, 312 bonds the PVC 302, 314, the thermobond adhesive 306, 310 bonds to the PET, and then the thermobond and the thermoset adhesives 304, 306 and 310, 312 will interstitially bond to each other. This effectively allows the assembly of dissimilar layers of PET and PVC into single layered card 300.

Finally, in step 424, individual cards 300 may be cut from the stock and embossed with information, such as account numbers, cardholder names, expiration dates, and magnetic strips applied, etc., as desired.

Added benefits of producing card 300 according to processes 400 and 418 include that the bond created by the combination of both thermoset and thermobond adhesives is both stronger than in PRIOR ART products. Furthermore, the bonds created in card 300 result in a very clear bond layer that has clarity of a magnitude that is far greater than what was possible in the PRIOR ART. This is because thermoset adhesives are generally known to be hazy or milky in appearance, but the mixing of thermoset and thermobond adhesives in the manner described herein in process 400 clears this haze and gives the bonded layer a very clean and clear finish.

If additional security measures, such as tagents, metal vapor deposition, holograms, or the like are desired, these additional features may be placed, as described above, prior to or during optional printing steps 405, 411, and/or 415; prior to or during the application of adhesive layers 304, 306, 310, and 312 in steps 404, 406, and 408; or prior to collating layers in step 420 of processes 400 or 418.

According to one aspect, the known properties of PET provide additional benefits in the construction of layered card 300. Specifically, PET has a very high melting point, so when included in the pressing step of the methods described herein, the PET layers do not melt. Instead, the other layers melt around the PET layers and the melting of the other materials fills in any spaces within or between the layers of material. This further aids in making the outer layers of card 300 very clear. The process also makes it possible to use PVC as the outermost layers of the cards 300 which ensures that the card 300 may be easily printed upon both during the finishing process, and after the finishing process is completed. Additionally, incorporating PET into card 300 ensures that the card is able to withstand higher pressures when in the press during processing. These pressures may be in the order of up to about 35 Newtons. PRIOR ART cards were not able to withstand pressures of more than about 7 Newtons up to about 11 Newtons. The increase in possible pressures in card 300 helps to ensure that the thermoset and thermobond adhesives melt more completely, thereby ensuring complete coverage of the surrounding layers with these adhesives and ensuring bonding between adjacent layers in the cards.

Figure 16:
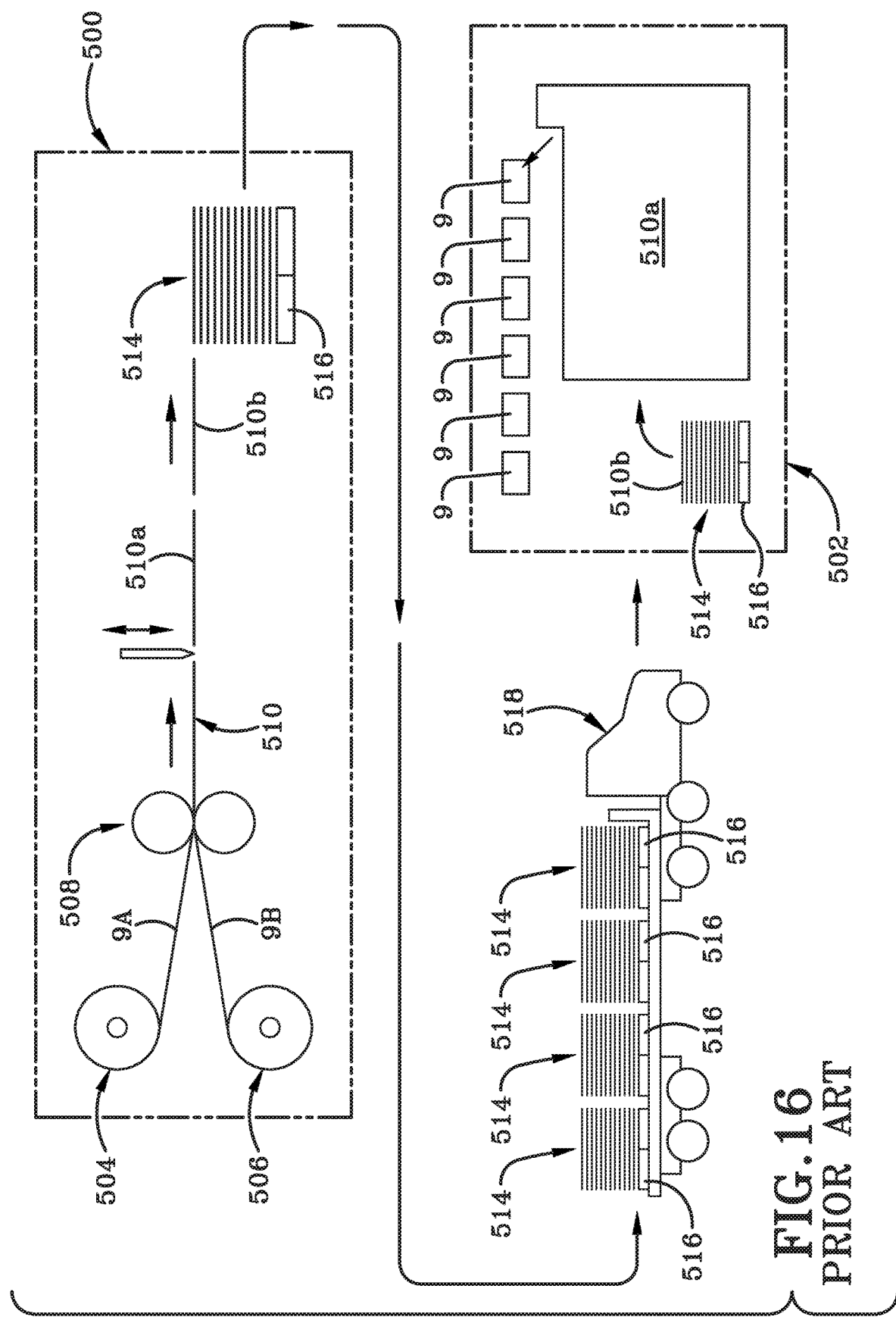
FIG. 16 is a diagrammatic side elevation view of a PRIOR ART process for fabricating a PRIOR ART card.

FIG. 16 is a diagrammatic side elevation view of a simplified PRIOR ART process for fabricating a PRIOR ART card 8 or 9 as shown in FIGS. 1-4 and described earlier herein. The process will be described with reference to the production of card 9 in a first plant 500 and in a second plant 502. In this process, the material of a first half 9A (FIG. 1B) is unwound off a roll 504 and the material of a second half 9B are unwound off a roll 506. The material of the first half 9A is overlaid over the material of the second half 9B and the two materials are passed through a press 508 where they are bonded together to form a combined material 510. Material 510 is a layer of card stock that is then moved in the direction of arrow "A" and passes through a cutting device 512. The cutting device 512 cuts the material 510 into a plurality of individual planar sheets of card stock represented as sheets 510a, 510b. Each sheet is a planar sheet and these planar sheets of card stock are assembled into a stack 514 on a pallet 516. A plurality of pallets 516 are shipped from first plant 502 to second plant 504 via some type of transportation device 518. When the pallets 514 arrive at the second plant 504, each planar sheet 510a, 510b etc. of card stock is individually removed from the stack 514 of card stock sheets on the pallet 516 and individual cards 9 are separated from each sheet of card stock such as sheet 510a. It will be understood that the entire process may occur in the first plant 502 and the transportation device 518 and second plant 504 may be omitted from the process. Additionally, individual sheets 510a, 510b etc. may not be stacked onto pallets 516 but may be sent directly through to the final step of the process where individual cards 9 are cut from the sheets 510a, 510b. In other instances, individual cards may simply be cut from the material 510 after it exits the press 508. The materials used in card 8 or 9 and the manner of how the cards 8 or 9 are produced and finished has been described earlier in this document.

Figure 17B:
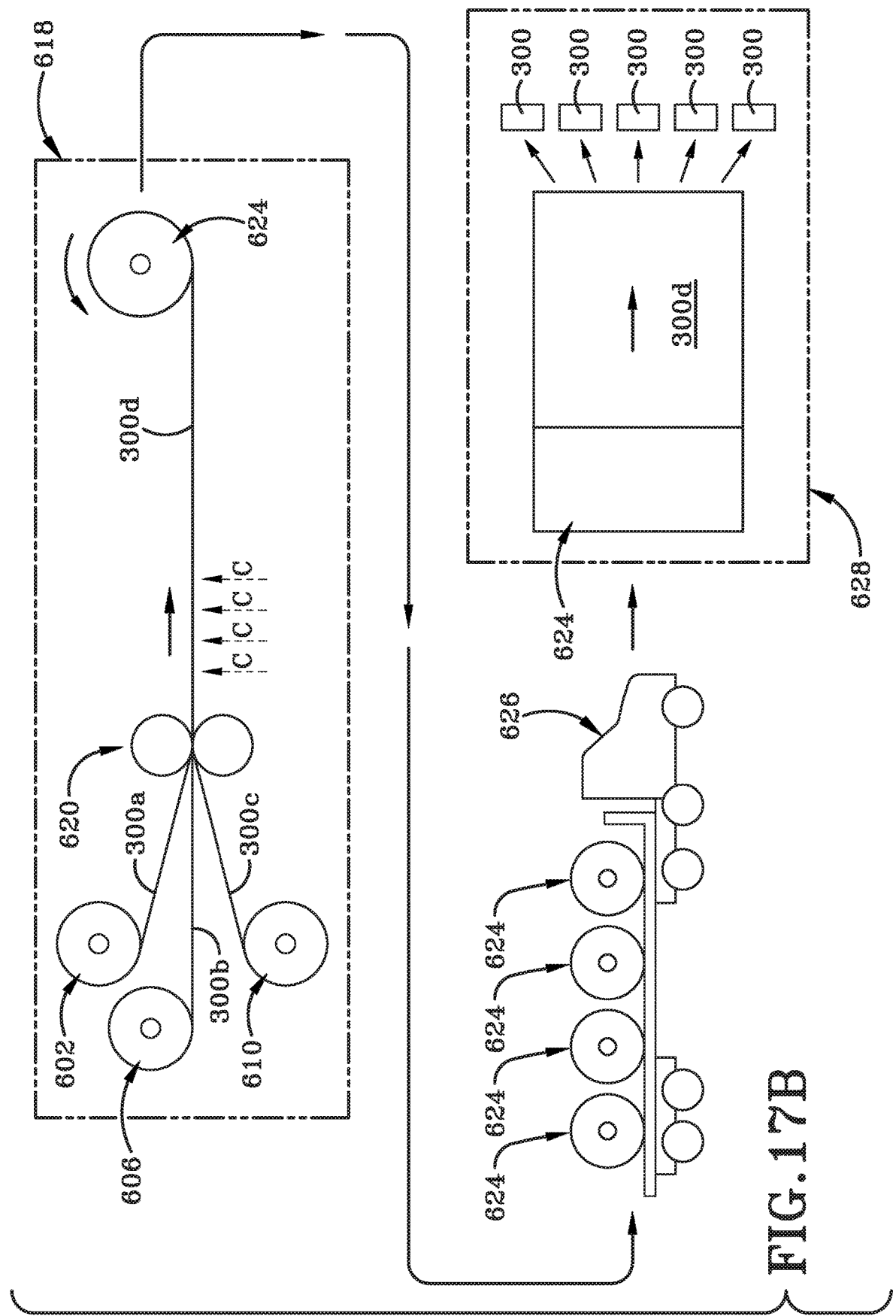
FIG. 17B is a diagrammatic side elevation view of a first set of steps of a process for producing a card in accordance with an aspect of the present disclosure.

FIGS. 17A and 17B are diagrammatic side elevation views of a process for producing cards 300 in accordance with FIGS. 10 through 14 as has been discussed earlier herein. In this process and in a first plant 600, a first layer 302 and a second layer 304 are assembled into a first card stock material 300a. The first card stock material 300a is allowed to set. In particular, the first card stock material 300a is set by being cooled by cooling drums, fans or another other suitable cooling mechanisms or equipment. The cooling of first card stock material 300a is indicated by the arrows "C". The first card stock material 300a is then rolled onto a roll 602.

In a second plant 604, a third layer 306, a fourth layer 308, and a fifth layer 310 are assembled into a second card stock material 300b. The second card stock material 300b is allowed to set. In particular, the second card stock material 300b is set by being cooled by cooling drums, fans or another other suitable cooling mechanisms or equipment. The cooling of second card stock material 300b is indicated by the arrows "C". The second card stock material 300b is then rolled onto a roll 606.

In a third plant 608, a sixth layer 312 and a seventh layer 314 are assembled into a third card stock material 300c. The third card stock material 300c is allowed to set. In particular, the third card stock material 300c is set by being cooled by cooling drums, fans or another other suitable cooling mechanisms or equipment. The cooling of third card stock material 300c is indicated by the arrows "C". The third card stock material 300c is then rolled onto a roll 610.

The materials that form the layers 302, 304, 306, 308, 310, 312 and 314 have been described earlier herein and therefore will not be discussed further with respect to the process illustrated in FIGS. 17A and 17B.

It will be understood that one or more of the first card stock material 300a, second card stock material 300b, and third card stock material 300c may be fabricated in a single plant, 602 for example. Alternatively, two of these card stock materials 300a, 300b, and 300c may be fabricated in one of the plants 602, 604, 608 and the remaining one of the card stock materials 300a, 300b, 300c may be fabricated in another one of the plants.

If, as illustrated in FIG. 17A, all three of the card stock materials 300a, 300b, 300c is fabricated in a separate plant, then these materials may be shipped out of the associated plants by transportation vehicles, such as 612, 614, and 616 and may be taken to a fourth plant 618 (FIG. 17B).

In the fourth plant 618, the first card stock material 300a is unrolled from roll 602, the second card stock material 300b is unrolled from roll 604, and the third card stock material 300c is unrolled from roll 308. First card stock material 300a is positioned to overlay second card stock material 300b, and second card stock material 300b is positioned to overlay third card stock material 300c. The overlaid three card stock materials 300a, 300b, 300c are passed through a hydraulic press 620 where pressure and heat are applied to the card stock materials, thereby bonding the same into a fourth card stock material 300d. The fourth card stock material 300d is set by being cooled by cooling drums, fans or another other suitable cooling mechanisms or equipment. The cooling of fourth card stock material 300d is indicated by the arrows "C" in FIG. 17B. The fourth card stock material 300d is then rolled onto a roll 624. One or more rolls 624 are then shipped out of plant 618 by transportation vehicle 626 and are taken to a fifth plant 628. In the fifth plant 628 the fourth card stock material 300d is unrolled from roll 624 and individual cards 300 are separated from the fourth card stock material 300d. It should be understood that the fourth card stock material 300d assumes a planar shape when unrolled from roll 624 and therefore may readily and easily be cut into cards 300.

It will be understood that cooling "C" of the first, second, third, and fourth card stocks 300a, 300b, 300c, 300d may be undertaken in order to set the thermoset adhesives and the thermobond adhesives that form part of these card stocks.

It will be understood that the plants 618 and 628 may be one and the same location, in which case the transportation vehicle 626 may be omitted. Furthermore, instead of fourth card stock material 300d being wound onto roll 624, the fourth card stock material 300d may be moved into a final stage of the process where individual cards 300 may be cut from the fourth card stock material 300d after cooling "C" thereof has occurred.

It will further be understood that additional finishing processing of the fourth card stock 300d may be undertaken as has been described earlier herein with the reference to process 400.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

One skilled in the art would appreciate that the concept of a thermoplastic coplanar isolation layer between two dissimilar plastic layers could be used in the construction of objects other than cards. For example, the sheets could be rolled to make a tube or a cup, such as a printed logo cup for a football stadium cup with a team's logo, etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "comprising" and "comprising essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the PRIOR ART because such terms are used for descriptive purposes and are intended to be broadly construed.

Moreover, the description and illustration of various embodiments of the disclosure are examples and the disclosure is not limited to the exact details shown or described.

What is claimed:

1. A layered card comprising:
   a first material layer that is substantially planar and has a first rate of thermal expansion and contraction;

a second material layer that is substantially planar and has a second rate of thermal expansion and contraction; wherein the second rate is different from the first rate; and a thermal adhesive layer separating the first material layer from the second material layer;

wherein the thermal adhesive layer bonds the first material layer and the second material layer together and permits the first material layer and the second material layer to expand and contract independently of each other while remaining substantially planar and parallel to each other.

2. The layered card of claim 1, wherein the thermal adhesive layer comprises a thermoset adhesive layer and a thermobond adhesive layer.

3. The layered card of claim 2 wherein the thermoset adhesive layer is positioned between the first material layer and the thermobond adhesive layer; and the first thermobond adhesive layer is positioned between the first thermoset adhesive layer and the second material layer.

4. The layered card of claim 2, wherein the first material layer is polyvinyl chloride (PVC) and the second material is polyethylene terephthalate (PET).

5. The layered card of claim 2, wherein the thermoset adhesive layer moves independently relative to the thermobond adhesive layer.

6. The layered card of claim 2, wherein the thermoset adhesive layer and the thermobond adhesive layer are merged into a single combined thermal adhesive layer upon application of heat and pressure to a stack formed from the first material layer, the thermoset adhesive layer, the thermobond adhesive layer, and the second material layer.

7. The layered card of claim 6, wherein the first material layer and the second material layer expand at different rates relative to each other upon the application of heat to the stack.

8. The layered card of claim 7, wherein the first material layer and the second material layer cool at different rates relative to each other upon cooling of the stack.

9. The layered card of claim 1, wherein the thermal adhesive layer is self-leveling.

10. The layered card of claim 2, wherein the thermoset adhesive layer and the thermobond adhesive layer form a geometric matrix of alternating peaks and valleys between them.

11. The layered card of claim 2, wherein the thermoset adhesive layer adheres to the first material layer; the thermobond adhesive layer adheres to the second material layer; and the thermoset adhesive layer and the thermobond adhesive layer adhere to each other.

12. The layered card of claim 1, further comprising a decorative layer or embossing applied to a surface of the second material layer; and wherein the thermal adhesive layer overlays the decorative layer or embossing and protects the decorative layer or embossing.

13. The layered card of claim 1, further comprising tagents provided in the thermal adhesive layer; wherein the tagents are within the adhesive layer prior to application of heat and pressure to a stack of the first material layer, the thermal adhesive layer and the second material layer.

14. The layered card of claim 13, wherein the tagents are fixed in place within the thermal adhesive layer after application of heat and pressure to the stack of the first material layer, the thermal adhesive layer and the second material layer.

15. A method of bonding a layered card comprising:

placing a planar first material layer, having a first rate of thermal expansion and contraction, on top of a thermal adhesive layer;

placing the first material layer and the thermal adhesive layer on top of a planar second material layer, wherein the second material layer has a second rate of thermal expansion and contraction; and the second rate is different to the first rate;

creating a stack of layers in which the first material layer is separated from the second material layer by the thermal adhesive layer;

applying heat and pressure to the stack of layers;

melting the thermal adhesive layer;

allowing the first material layer and the second material layer to expand independently of each other while heat is being applied to the stack of layers;

bonding the first material layer and the second material to each other with the thermal adhesive layer; and maintaining a planar profile of the stack of layers.

16. The method of claim 15, further comprising:

cooling the stack of layers; and allowing the first material layer and the second material layer to contract independently of each other while the stack is cooled.

17. The method of claim 15, wherein the placing of the first material layer on top of the thermal adhesive layer further comprises placing the first material layer on top of a thermoset adhesive layer; and placing the first material layer and thermoset adhesive layer on top of a thermobond adhesive layer; and then placing the first material layer, the thermoset adhesive layer, and thermobond adhesive layer on top of the second material layer.

18. The method of claim 15, wherein the bonding includes bonding the thermoset adhesive layer to the first material layer; bonding the thermobond adhesive layer to the second material layer; and bonding the thermoset adhesive layer and the thermobond adhesive layer to each other.

19. The method of claim 15, wherein the melting includes melting the thermoset adhesive layer and thermobond adhesive layer and forming a single combined thermal adhesive layer.

20. The method of claim 19, further comprising forming alternating peaks and ridges in the thermoset adhesive layer and the thermobond adhesive layer; compressing the peaks and ridges upon application of heat and pressure to the stack of layers; and mixing the thermoset adhesive layer and the thermobond adhesive layer.

* * * * *